US010129299B1

(12) United States Patent
McClintock et al.

(10) Patent No.: US 10,129,299 B1
(45) Date of Patent: Nov. 13, 2018

(54) NETWORK BEACON MANAGEMENT OF SECURITY POLICIES

(71) Applicant: Amazon Technologies, Inc., Reno, NV (US)

(72) Inventors: Jon Arron McClintock, Seattle, WA (US); Darren Ernest Canavor, Redmond, WA (US); Jesper Mikael Johansson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/298,860

(22) Filed: Jun. 6, 2014

(51) Int. Cl.
*H04L 29/06* (2006.01)
*H04W 12/08* (2009.01)

(52) U.S. Cl.
CPC .............. *H04L 63/20* (2013.01); *H04L 63/08* (2013.01)

(58) Field of Classification Search
CPC ...... H04L 63/20; H04L 63/107; H04W 12/06; H04W 12/08
USPC ............... 726/6; 709/226; 713/171; 455/410
See application file for complete search history.

(56) References Cited

U.S. PATENT DOCUMENTS

| 8,625,788 | B2 | 1/2014 | Pendakur et al. |
| 2004/0003250 | A1* | 1/2004 | Kindberg et al. ............. 713/171 |
| 2009/0319793 | A1 | 12/2009 | Zic et al. |
| 2012/0185291 | A1 | 7/2012 | Ramaswamy et al. |
| 2014/0068744 | A1 | 3/2014 | Bran et al. |
| 2014/0187200 | A1* | 7/2014 | Reitter et al. .................. 455/410 |
| 2014/0215594 | A1* | 7/2014 | Lambert ............. H04L 63/0823 726/7 |
| 2014/0280955 | A1* | 9/2014 | Stuntebeck et al. .......... 709/226 |
| 2014/0310788 | A1* | 10/2014 | Ricci ................................ 726/6 |

OTHER PUBLICATIONS

Hodgkins, Kelly, "Apple Explores Auto-Adjusting Security and Other Settings Based on Device Location", retrieved from http://www.macrumors.com/2014/07/03/patent-security-location/, Jul. 3, 2014, 7 pages.
iBeacon, retrieved from http://en.wikipedia.org/wiki/Ibeacon, the free encyclopedia, Jul. 7, 2014, 7 pages.
International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Noura Zoubair
(74) *Attorney, Agent, or Firm* — Davis Wright Tremaine LLP

(57) ABSTRACT

A variety of different mobile computing devices, such as a laptop, tablet or smartphone, may be used in a mixed set of computing environments. At least some of the computing environments may be hostile computing environments where users of the mobile computing devices may be exposed to unknown risks. Furthermore, the mobile computing devices may be unable to determine if a network in a particular computing environment is in fact the network the mobile device determines it to be. A beacon device may be attached to a network and provide mutual authentication for mobile devices in the computing environment. Various security policies may be adjusted as a result of the user device and the beacon device successfully authenticating the other device.

20 Claims, 19 Drawing Sheets

(56) References Cited

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Karygiannis et al., "Wireless Network Security: 802.11, Bluetooth and Handheld Devices," National Institute of Standards and Technology (NIST) Special Publication 800-48, Nov. 2002, 119 pages.

\* cited by examiner

NETWORK BEACON MANAGEMENT OF SECURITY POLICIES

BACKGROUND

Different networks provide varying levels of security and users may trust different networks more than other networks. Users utilizing computing resources, such as those provided by a remote resource provider or those operated by the user, are able to set access policies associated with the computing resources. The access control policies control dictate privileges given to users or groups of users of the computing resources and control actions associated with the computing resources that are permitted to be performed. For example, the access policies may specify information identifying actions associated with the computing resources that users are allowed to perform or user privileges required for performing certain actions. The access control policies may be insufficient or may be overly restrictive depending on the environment and the networks present to the users utilizing the computing resources.

BRIEF DESCRIPTION OF THE DRAWINGS

Various embodiments in accordance with the present disclosure will be described with reference to the drawings, in which.

DETAILED DESCRIPTION

Figure 1:
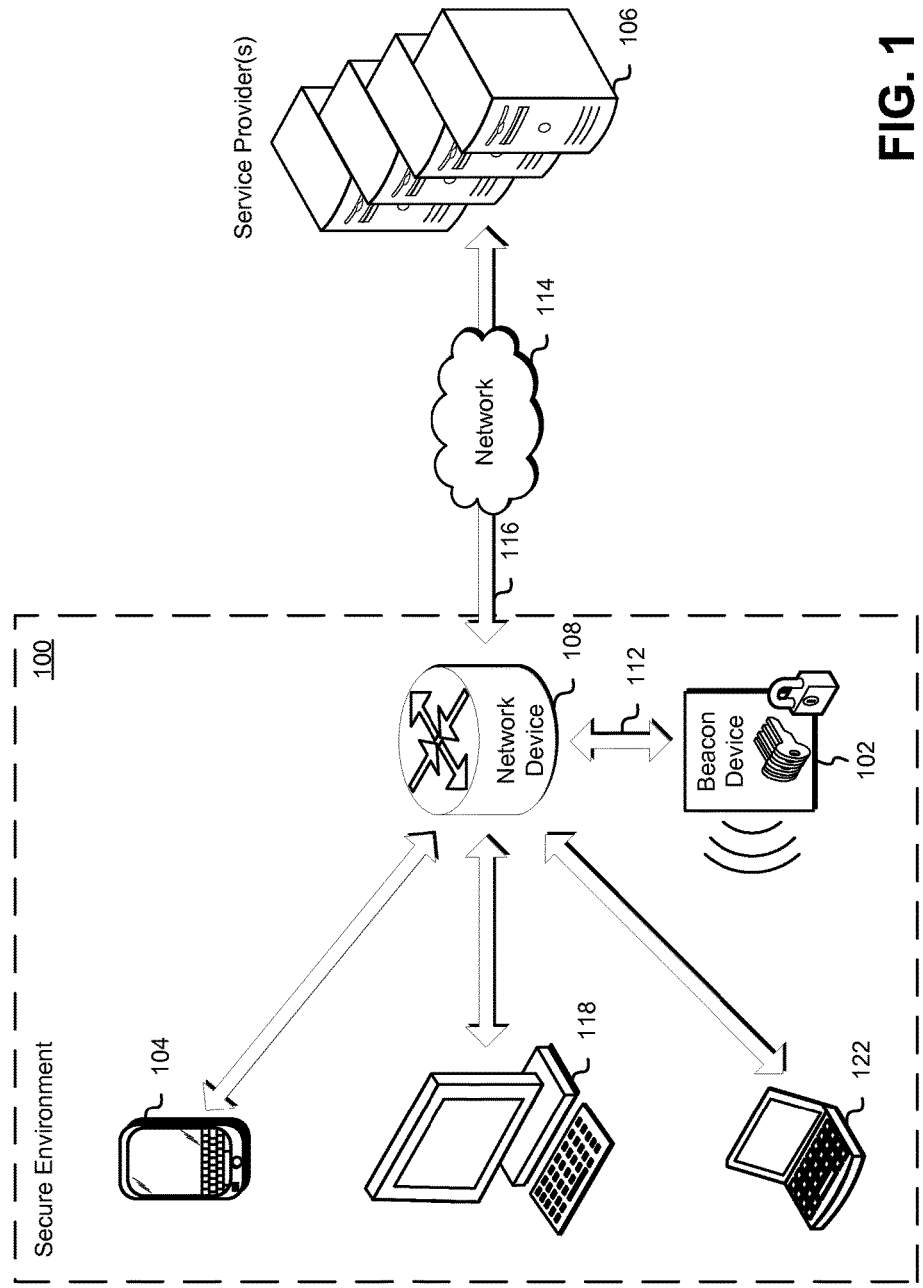
FIG. 1 is an illustrative example of a beacon device operating within a secure environment in accordance with one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to network devices such that the enhanced network devices are capable of implementing a secure computing environment for computing devices connected to the same network as the enhanced network devices. The enhanced network devices, also referred to as beacon devices, may be configured to perform mutual authentication for computing devices connected to the same network as the beacon device. The beacon device may be further configured to authenticate the network to the computing devices. A common use case for computing devices including mobile computing devices, such as laptops, tablets, smartphones or wearable devices, is to use the computing device in a mixed set of computing environments. Examples of mixed use computing environments may include a user's home or office as well as coffee shop, airports, hotel rooms and other environments where a user may connect to a network.

A portion of the environments, such as the user's home or office, may be considered secure, while another portion of the environments, such as a coffee shop or airport, may be hostile. A secure environment may be an environment where at least some level of security is implemented to mitigate attacks on the user. For example, the user's office network may be considered a secure environment because users connecting to the office network may be required to provide authentication information to a device on the office network. An untrusted environment may be an environment where the user is exposed to at least some unknown or known risk. For example, a coffee shop may provide an open network where any device may connect to the network without providing authentication information. For secure environments, including a beacon device, computing devices operated by users on the network may detect the presence of the beacon device and may modify security setting as a result on detecting the beacon device.

The beacon device may be connected to a network in a secure environment. Once connected, the beacon may act as a secure second-factor authenticator, such that whenever a user's computing device is able to communicate with the authenticating device using the network, the user may not need to authenticate via a username and password to access a protected resource. For example, the beacon device may contain an authorization token that, when provided with a request to access a protected resource, enables the user responsible for the request to access the protected resource without requiring the user to enter credentials. In one embodiment, the beacon device may be connected to the user's home network, the user may then provision a computing device, such as the user's smartphone, to utilize the beacon device as an authentication device.

Provisioning the beacon device to enable authentication may involve three-party communication between the computing device, the beacon device and the service which requires authentication. During the provisioning process, the user may establish a trust relationship between the user's computing device and the beacon device, such that the user's computing device can authenticate itself to the beacon device, and a trust relationship between the beacon device and the service requiring authentication, such that the service requiring authentication trusts the beacon device. For example, the user may pair a smartphone with the beacon device over a Bluetooth® connection wherein the smartphone and the beacon device exchange a shared secret. After the computing device is paired with the beacon device, when the computing device attempts to authenticate a user to the service requiring authentication, the computing device may first attempt to acquire an authentication token from the beacon device. For example, the beacon device may implement a Kerberos server, where the beacon device may act as a Key Distribution Center. If the computing device successfully receives the authentication token, the computing device may authenticate the user with the authentication token. If the computing device does not receive an authentication token from the beacon device, the computing device may prompt the user for their login and password to authenticate the user to the service requiring authentication.

The beacon device may also provide a password store to store credentials, such as user names and passwords, and roam the credentials to additional computing devices. For example, the user may cause their user name and password required for accessing a particular computing resource to be saved by the beacon device. Furthermore, the user may then cause the beacon device to transmit the saved user name and password to other computing devices in the same secure environment as the beacon device. In some embodiments, the beacon device transmits the user name and password saved by the user to another beacon device operating remotely in a different secure environment. For example, the user may provision the beacon device with various different credentials from the user's office network and cause the beacon device to migrate the various saved credentials to the user's home network.

Computing devices connected to a network in which the beacon device is accessible may be configured to automatically disable, reduce or otherwise modify security policies, authentication requirements and/or security applications executed by the computing device. In an example, a smartphone operated by the user may not require the user to input a security pin using an input device connected to the smartphone in order to access resources of the smartphone. In another example, a media streaming device connected to the network may detect the presence of the beacon device and may modify the device's security setting to accept connections on any port. The beacon device may enable the user to permit unlimited multi-user access to computing resources in a secure environment, but not in an untrusted environment where the beacon device is not present. For example, if the user has a tablet connected to the user's home network, the beacon device may allow anyone in the home to access the tablet without providing credentials. However, if the user then takes the tablet to a hotel and the tablet no longer detects the beacon device, the tablet may then require a password to access the tablet or various applications loaded into memory of the tablet.

The beacon device may also enable a variety of parental control features and other policy driven mechanisms. For example, the user may disable access to certain websites or services offered by the service providers. Furthermore, the beacon device may limit access to computing resources based at least in part on various attributes including time, device connected to the network, security settings of the network, time of day, device not present on the network or room temperature detected by the beacon device, global positioning coordinates of the beacon device or other attributes detectable by the beacon device.

The beacon device may enforce at least a portion of the policy mechanisms by encrypting data on computing devices of the user. For example, the user may receive an encryption key from the beacon device and the user's computing device may use the encryption key to encrypt a particular software application or data stored on the user's computing device such that the application may only be accessible by the computing device when the beacon device is detected. When the user attempts to access the application using the user's computing device, the computing device may retrieve a decryption key from the beacon device. In addition, the beacon device may provide the computing device with an encryption key and the computing device may utilize the encryption key to encrypt the entire file system of the user's computing devices. The beacon device may provide the decryption key based at least on information collected by the beacon device including policies received by the beacon device. For example, the beacon device may provide the decryption key if a defined policy allows for the execution of the application and certain devices present on the network. This may ensure not only that the policies are enforced but may also mitigate at least some security risk.

The beacon device may also be used to provision computing devices with (i.e., provide or otherwise cause to obtain) passwords, credentials, tokens, settings and other information useable for operating in the secure environment. The beacon device may implement a provisioning network, the provisioning network may be a network configured to allow connections from computing devices and transmit provisioning information to the connected computing devices. For example, the beacon device may implement the provisioning network with a particular service set identifier (SSID), a computing device may then connect to the network and transmit information corresponding to the computing device to the beacon device over the provisioning network. The beacon device may collect the information corresponding to the computing device for provisioning and provide the information to an authoritative computing device for approval. For example, the beacon device may execute an interface, such as a management console exposed as a webpage, configured to enable the user to select particular provisioning information to be provided to the computing device for provisioning.

The beacon device may also obtain approval from the user through a particular computing device indicated by the user as an authoritative computing device. For example, the user may indicate to the beacon device that the user's smartphone is the authoritative device for the secure environment. When a new computing device requires provisioning, the beacon device may transmit information to the user's smartphone in order to obtain approval for provisioning of the new computing device. Furthermore, the user may indicate particular information to be transmitted to the computing device for provisioning. For example, the user may indicate to the beacon device to transmit credential information for a particular media streaming service. The beacon device may obtain the credential information from the user or the beacon device may be configured with the credentials at some point in time prior to provisioning the new computing device.

The beacon device may be further configured to detect if the beacon device has been moved to a new location. For example, the user may move the beacon device from the user's home network to a new location. The beacon device may detect that the beacon device has been moved to a new location and may adjust security setting as a result, such as requiring stronger authentication. The beacon device may also be configured to provide two factor authentication at the new location. Once moved, the beacon device may collect environmental data and network data in order to determine security settings to implement to provide a secure environment. The beacon device may be integrated into another device such as a router (also referred to as an access point device) or set-top box.

FIG. 1 illustrates an example environment where one or more computer systems running within a secure environment 100, as well as the associated code running thereon, may provide enhanced security and accessibility features for a computing device within the secure environment 100. A beacon device 102 may be within the secure environment 100 and may be responsible for enabling the enhanced security and accessibility features for one or more computing devices, such as a user device 104, within the same secure environment 100. The secure environment 100 may include a variety of different environments such as physically secure environment where access is physically restricted. For example, the secure environment may include the user's home which is secured by lock and key. In another example, the secure environment may be the user's office building which requires a key card in order to gain entry. Additionally, the environment may be a secure network environment. For example, the network may be behind a firewall or other access control device. In another example, the devices on the network may be physically proximate such as being close enough to communicate over a nearfield communications network. The one or more computing devices may be a smartphone, a desktop computer 118 and a laptop 122. The beacon device 102 may be a stand-alone device connected to another device on a network within the secure environment or may be integrated into another device on the network within the secure environment. For example, the beacon device 102 may be connected 112 to a network device 108, the network device 108 being an end point for the local network within the secure environment 100. The network device 108 may be a router, modem, firewall or other device suitable for allowing the computing device within the secure environment 100 to connect to one or more other computing devices located on the network 114. The connection 112 between the beacon device 102 and the network device 108 may be a physical connection, a wireless connection or other connection suitable for sending and receiving information over a network. Furthermore, the beacon device 102 may use a non-routable protocol to communicate with one or more other devices in the secure environment 100.

The network 114 may be any suitable network such as the Internet, a local area network, wide area network or any other suitable communications network and/or other networks noted herein and/or combinations of networks. The network device 108 may allow computing devices, such as the beacon device 102 or the user device 104, to establish a connection 116 over the network 114 to one or more service providers 106. In some embodiments, the service provider 106 may provide a distributed, virtualized and/or datacenter environment within which one or more applications, processes, services, virtual machines and/or other such computer system entities may be executed. The term service provider 106, unless otherwise clear from context, is intended to be read in the broad sense to imply an organization that provides a service to users in some manner. The beacon device 102 may connect to the one or more service providers 106 in order to obtain and/or provide credential information on behalf of users of the computing devices (also referred to simply as user devices) within the secure environment 100, such as the desktop 118 or laptop 122.

The devices illustrated in FIG. 1 are for illustrative purposes and the user devices illustrated may be any type of device that is configured to operate in accordance with one or more policies enabled by the beacon device 102. The user device may implement a particular security state based at least in part on the one or more policies. A security state may include a subset of the one or more policies currently implemented by the user device 104. Further, the user devices may be configured to receive authentication information from the beacon device 102, the authentication information useable to authenticate the user devices to the one or more service providers 106. The user devices may be any type of consumer electronics device including a laptop or desktop computer, a tablet, a mobile phone or a smartphone, a smart television, a set-top box or a stream player or a network-enabled digital optical disk player, such as a Blu-ray® player or digital versatile disc (DVD)® player, among others. The user devices may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, Bluetooth®, or other short range communications protocol, among others. For example, the user may pair the smartphone with the beacon device 102 using a short range communications protocol, such as Bluetooth®, in order to exchange a shared secret useable in performing mutual authentication between the smartphone and the beacon device 102. The user device 104 and the beacon device 102 may exchange the shared secret by transmitting the secret over a connection between the user device 104 and the beacon device 102. The user device 104 and the beacon device 102 may also perform mutual authentication proving possession of the shared secret (e.g., with a digital signature). Successful completion of the mutual authentication process may indicate to the user device 104 that the network is authenticated and in fact the network the user device 104 determined it is connected to. The beacon device 102 may be configured to authenticate the network, network device 108 and/or secure environment 100 to the user device 104 independent of any configuration of the network, network device 108 and/or secure environment 100. For example, the beacon device 102 may provide the user device 104 with authentication information capable of authenticating the network device 108 independently of any authentication configuration of the network device 108 such as Wi-Fi Protected Access (WPA) or other security protocol implemented by the network device 108.

The user devices may be equipped with a processor, such as a central processing unit (CPU) or a graphics processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user devices may also be equipped with one or more input peripherals, such as a touch screen that responds to a fingertip or a stylus input, a physical keyboard, a digital camera, a microphone, a touchpad or a mouse, among others. The user device may further be equipped with a global positioning system (GPS) circuitry that enables locating the device. The beacon device 102 may be configured to receive information from the one or more input peripherals of the user devices and the beacon device may also be configured with one or more input peripherals. For example, the beacon device 102 may include a touch screen configured to enable to user to input a pairing command, the beacon device may then display a quick response (QR) code. The QR code may then be captured by a camera of the user device and information obtained from the QR code may be transmitted by the user device to the beacon device 102 in order to complete the pairing operation.

Furthermore, the user devices may be configured with one or more applications that facilitate receiving voice inputs or voice commands from a user via the microphone or image inputs via a digital camera. In addition, the user devices may also be equipped with one or more output peripherals such as a screen or speakers, whereby if the user device is equipped with a touch screen, the touch screen may serve as both an input and an output peripheral device. The user devices may further be equipped with an operating system and may be configured to execute software applications and programs compatible with the operating systems. The software applications and programs may be configured to implement a variety of security enhancements and accessibility features provided by the beacon device. For example, the user devices may include a loader application configured to receive a key from the beacon device 102 and use the key to decrypt an executable application such that the executable application may be executed by the user device. In another example, the user device may include an application or operating system component configured to lock the device such that the device is inoperable without inputting the correct passcode. The application or operating system component may be further configured such that when the user device is capable of detecting the beacon device 102 on the network in the secure environment, the device lock is disabled such that the device may be operated within the secure environment without the need to enter a passcode.

Various features and/or operations of the user devices may be disabled, altered or modified based at least in part on the presence or lack of presence of the beacon device 102. For example, applications of the user devices may be configured such that the applications will not execute unless the beacon device 102 is available on the network. Furthermore, particular files or data objects associated with an application may not render or otherwise be processed by the associated application unless the beacon device 102 is available on the network. For example, a document may be tagged or otherwise identified such that a word processing application associated with the document and executed by the user device will not render the document unless the beacon device 102 is detected. The tag may be contained in metadata associated with the file or may be contained in a record stored on the user device. In some embodiments, the file may be encrypted with a key controlled by the beacon device 102 and the application associated with the file may obtain the key from the beacon device 102 when the user device is in the secure environment. In other embodiments, a storage device or other similar device contained in the user device or connected to the user device may not allow the tagged file to be read or otherwise interacted with unless the beacon device 102 is present. For example, a Universal Serial Bus (USB) drive connected to the user device may contain a file tagged as "secure" and configured such that the file can only be accessed when the USB driver executed by the user device detects the presence of the beacon device 102. If the beacon device 102 is detected by the user device, the USB driver may enable one or more application to access the tagged file.

Figure 2:
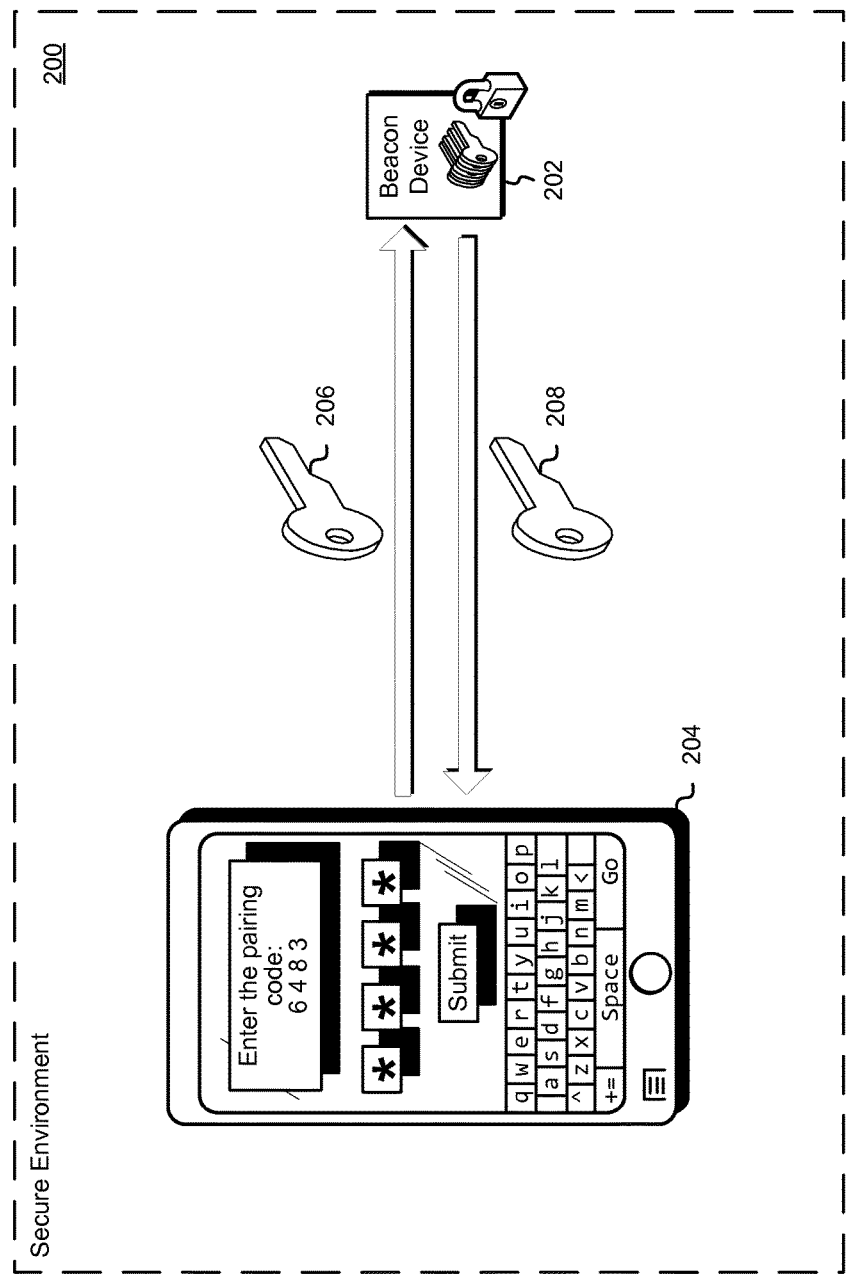
FIG. 2 is an illustrative example of a beacon device executing a pairing process with a user device in accordance with one embodiment.

FIG. 2 illustrates an example environment where one or more computer systems running within a secure environment 200, as well as the associated code running thereon, may provide a pairing mechanism configured to establish a shared secret between two or more devices. The pairing process may be triggered either by a specific request from a user to generate a bond or may be triggered automatically when connecting to a service where the identity of a user device is required for security purposes. For example, the user explicitly requests, by inputting a command into a user device 204 or a beacon device 202, to add the particular user device. In another example, the beacon device 202 may be configured to initiate the pairing process without a contemporaneous command from the user when a particular user device is detectable within the secure environment 200. The particular user device may be a device which the beacon device 202 does not contain a record in a database of paired devices.

During the pairing process, the user device 204 may generate a user key 206 and exchange the user key 206 with a device key 208 generated by the beacon device. In various embodiments, the user key 206 and the device key 208 may be generated as a result of a cryptographic algorithm such as public-key cryptography. Public-key cryptography, also known as asymmetric cryptography, refers to a cryptographic algorithm which requires two separate keys, one of which is secret (or private) and one of which is public. Although different, the two parts of this key pair may be mathematically linked such that the keys may be identified as a pair of keys. The public key may be used to encrypt plain text or to verify a digital signature and the private key may be used to decrypt ciphertext or to create a digital signature. The public key and the private key may be used to perform opposite functions, such that each function may be the inverse of the other. In some embodiments, the user key 206 and the device key 208 may include identifying information capable of identifying the environment and whether the beacon device 202 is responsible for managing the user device 204.

The pairing process may involve at least some level of user interaction through an input peripheral of the user device 204 and/or the beacon device. In various embodiments, an input peripheral for the beacon device 202 may include a particular user device configured to communicate information to the beacon device through an interface of the beacon device 202 exposed to the particular user device. As illustrated in FIG. 2, the user may be required to enter a pin or other passcode in order to establish the identity of the user device and generate the bond between the user device 204 and the beacon device 202. The identity of the user device 204 and/or the beacon device 202 may be confirmed based at least in part on the user interaction. Once the pairing operation is completed successfully, a bond may be formed between the user device 204 and the beacon device 202, enabling the user device 204 and the beacon device 202 to establish a connection without requiring the pairing process in order to confirm the identity of the devices. Both the user device 204 and the beacon device 202 may maintain a database of paired devices containing a record of the particular device.

During the pairing process, the user device 204 and the beacon device 202 may establish a relationship by generating a shared secret key (also referred to as a link key). The link key may be stored in the database of paired devices, as described above, and associated with a particular device. The user device 204 and the beacon device 202 may cryptographically authenticate the identity of the other device, and if successful the devices may determine with at least some level of security that the other device is the device that was previously paired. For example, the user device 204 may enter the secure environment 200 and detect the presence of the beacon device 202. The user device 204 and the beacon device 202 may then exchange the previously-established shared secret thereby confirming the devices' identity to each other. Furthermore, once a link key has been generated, an authenticated Asynchronous Connection-Less (ACL) link between the devices may be encrypted so that the data that may be exchanged securely. For example, the user device 204 and/or the beacon device 202 may encrypt credential information using the link key in order to protect the credentials during transmission.

Figure 3:
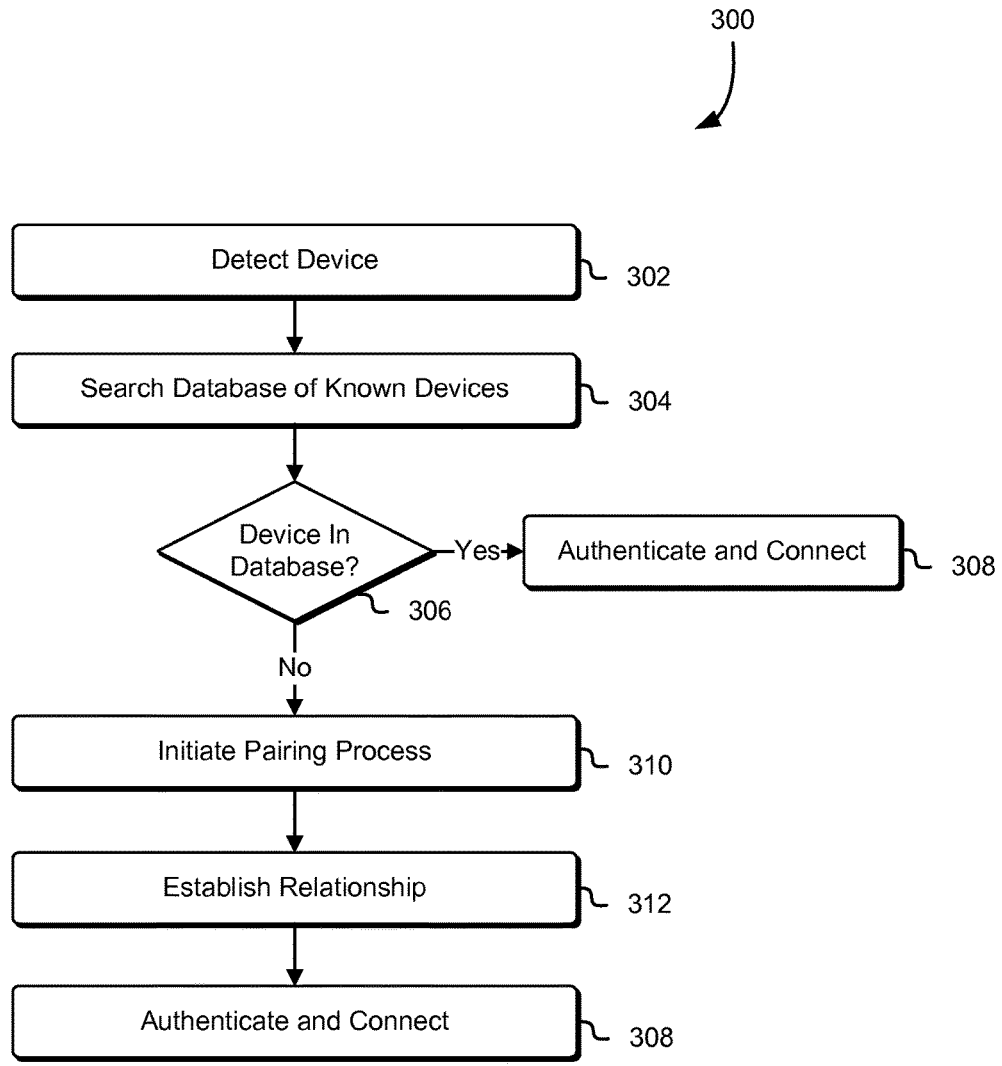
FIG. 3 is an illustrative example of a process for pairing a beacon device with a user device in accordance with one embodiment.

FIG. 3 shows an illustrative example of a process 300 which may be used to pair and establish connections between computing devices. The process 300 may be performed by any suitable systems, such as by user device 204 and the beacon device 202 as described in connection with FIG. 2. Returning to FIG. 3, in an embodiment, the process 300 includes detecting a device 302. Detecting a device 302 may include two or more devices detecting the presence of each other device. For example, the user device may enter a secure environment and detect the presence of the beacon device and the beacon device may detect the presence of the user device. The user device may connect to a local area network within the secure environment and an application or operating system component of the user device may check for the availability of the beacon device or other devices on the network. For example, the user device may transmit a broadcast message using the User Datagram Protocol (UDP) in order to establish a connection with the beacon device. The beacon device may be configured to receive information over the network suitable for detecting devices on the network and establishing a connection with the detected devices. The user device may also detect the beacon device based at least in part on a radio-frequency identification (RFID) tag associated with the beacon device.

Once the device is detected, a database of known devices may be searched 304 for a record indicating a shared secret and/or established relationship with the detected device such as a link key described above. For example, the beacon device may search the database of paired devices for a shared secret based at least in part on an identifier of the detected device. If the record of the device is in the database 306 the devices may then mutually authenticate to the other device and establish a connection 308. In numerous variations of process 300, once authenticated the device may connect to another device such as a network device described above in connection with FIG. 1. For example, once the user device has authenticated the beacon device the user device may connect to the local area network within the secure environment. The user device may also connect to the local area network first and then attempt to detect and authenticate the beacon device. If the user device detects the beacon device and successfully authenticates the beacon device, the user device may enforce policies associated with the secure environment. However, if the beacon device is not detected or not successfully authenticated, the user device may enforce policies associated with an untrusted environment.

In some embodiments, authentication with the beacon device, pairing operations with the beacon device and/or policies managed by the beacon device may be modified based at least in part on one or more attributes of the secure environment. For example, the secure environment may be an environment that is only physically secured with a lock and key. In such cases, the beacon device may modify one or more policies of the user devices in the secure environment to prevent network connections on certain ports. In another example, the secure environment may be physically secure and the network located in the secure environment may be protected by a firewall. Furthermore, the secure environment may additionally require user devices to be in close proximity with each other in order to communicate over the network located in the secure environment.

If no record of the device is contained in the database 306, the paring process may be initiated. The pairing process may be any suitable process for establishing a shared secret such as the process described above in connection with FIG. 2. Once the pairing process has been initiated, the devices may establish a relationship 312. For example, the beacon devices may combine the beacon device's private key with the user device's public key and the user device may combine the user device's private key with the beacon device's public key in order to establish a shared secret between the user device and the beacon device. The beacon device may exchange the generated shared secret with the user device over a variety of different connections including a local network, near field communications or other connection suitable for exchanging information. A variety of different operations may be performed in order to establish the relationship 312, including pushing software or firmware to the user device, exchanging credential information, establishing security policies, obtaining authentication information or other operations suitable for establishing a relationship between two or more devices. Furthermore, a limitation may be placed on the extent and type of connection that may be used to exchange the shared secret. For example, the connection may be limited such that both the beacon device and the user device must be within the secure environment. Once the shared secret has been exchanged, the beacon device and the user device may authenticate the exchanged information and establish a connection 308.

Figure 4A:
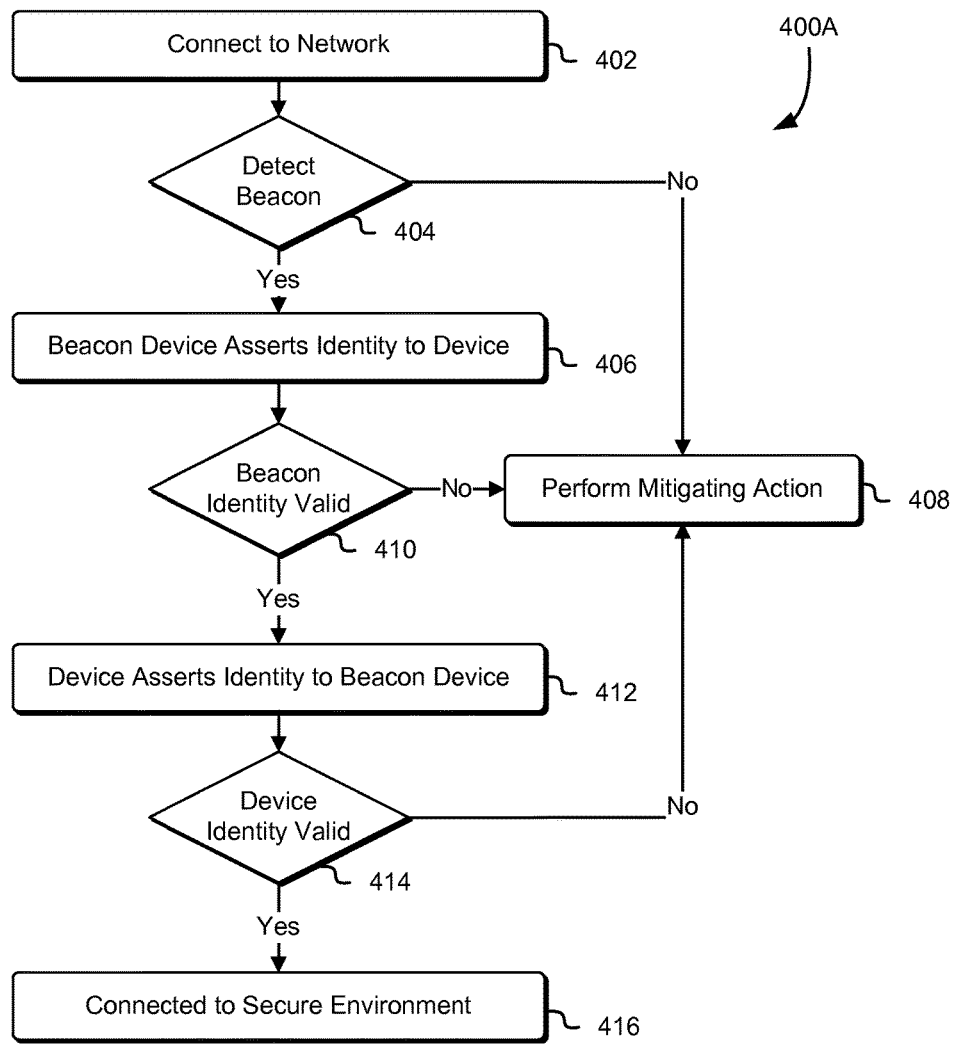
FIGS. 4A and 4B are an illustrative example of a process for establishing a connection to a network in a secure environment in accordance with various embodiments.
Figure 4B:
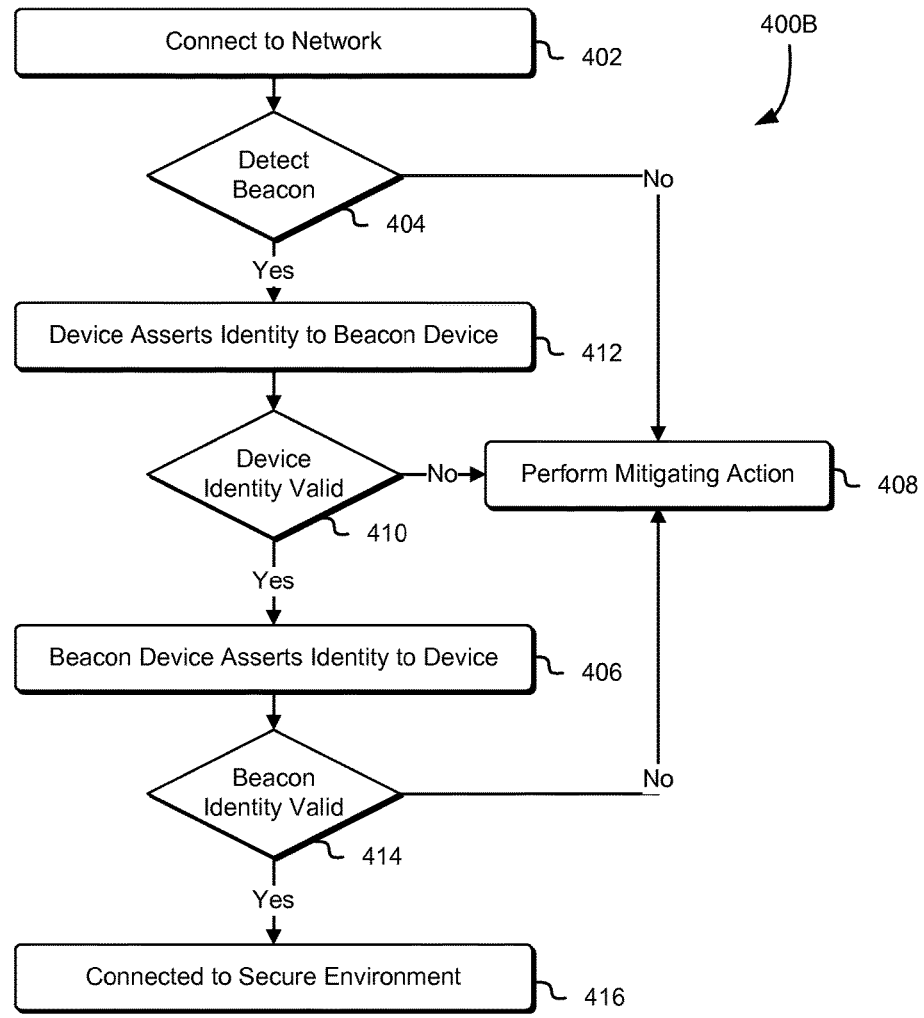

FIGS. 4A and 4B show an illustrative example of processes 400A and 400 B which may be used to establish whether a user device is connected to a secure environment or an untrusted environment. The process 400 may be performed by any suitable system, such as by user device 204 and the beacon device 202 as described in connection with FIG. 2. Returning to FIG. 4, in an embodiment, the process 400 includes connecting to a network 402. The network may be any suitable network as described in connection with FIG. 1. The user device may connect to the network based at least in part on a command user entered through an input peripheral of the user device. The command or commands to initiate the connection to the network may originate from the same origin as the command or commands to connect to the network or may originate from another computer system and/or server, or may originate from a different entity, user or process on the same or a different remote network location, or may originate from a different entity, user or process within the computing resource service provider, or may originate from a different user of a user device, or may originate as a result of a combination of these and/or other such same and/or different entities. For example, the user device may be configured to automatically connect to networks within a certain range.

Once connected the user device may detect the presence on the beacon device on the network 404. In numerous variations to the process 400A, once the user device detects the availability of the beacon device on the network the user device may assert the user device's identity to the beacon device, as illustrated below by FIG. 4B. The user device may assert an identity to the beacon device by at least transmitting a shared secret to the beacon device or other credential information such as a user name and/or password. Returning to FIG. 4A, if the beacon device is not detected 404, the user device may perform one or more mitigation actions 408. For example, the user device may disconnect from the network, delete all or a portion of the data stored on the user device, lock the user device, transmit a notification or alarm to one or more other devices, increase at least one security measure or any other action suitable for operation of the user device in an untrusted environment. If the beacon device is detected on the network and/or in the same environment as the user device, the beacon device may assert the beacon device's identity to the user device 406. For example, once the user device detects the beacon device over a near field communications network, the beacon device may transmit identification information to the user device.

If the identity asserted by the beacon device is valid 410, the user device may then assert the user device's identity to the beacon device 412. If the identity asserted by the beacon device is invalid 410, the user device may perform one or more mitigating actions 408 as described above. The user device may determine if the asserted identity is valid by locating a record of the asserted identity in a database of known devices as described above in connection with FIG. 3. A variety of different techniques may also be used in order for the user device to validate the identity asserted by the beacon device such as a shared secret, asymmetric cryptography or other techniques suitable for validating device identity. The beacon device may also determine if the identity asserted by the user device is valid 414 using similar techniques. For example, the beacon device may also search a database of known devices for information corresponding to the identity asserted by the user device. If the asserted identity is invalid, the beacon device may perform one or more mitigation actions 408, such as any of the mitigation actions described herein. For example, the beacon device may cause the user device to be disconnected from the network, issue an alarm or other notification, cause a security state with at least one other device connected to the network to be modified or any other action suitable for reducing a security risk associated with untrusted devices. Once the user device's identity has been validated the user device may establish that the user device is connected to a secure environment 416. Establishing that the user device is connected to a secure environment may enable the user device to operate in a particular security state requiring weaker or less authentication.

Turning to FIG. 4B, the process 400B may operate similarly to process 400A however the user device may assert an identity to the beacon device 512 prior to the beacon device asserting an identity to the user device 506. The beacon device or other device may then determine if the identity is valid 410. For example, a router or other network endpoint in the secure environment may determine if the password or hash of the password transmitted by the user device is a valid password for accessing the network within the secure environment. If it is determined that the identity is invalid, one or more mitigating actions may be performed 408. For example, the beacon device or other device may disconnect the device from the network and block any additional attempts to connect to the network. In a variation of process 400, the identity of the user device may be valid but not previously recorded by the beacon device. The beacon device may then perform mitigating actions 408 such as increasing the security of one or more devices in the secure environment and/or authenticating the user device.

If the identity of the user device is valid, the beacon device may assert the beacon device's identity to the user device 406. For example, the beacon device may transmit a shared secret to the user device. The user device may then determine if the assert identity is valid 414. For example, the user device may check the asserted identity against a previously recorded identity established during a pairing operation with the beacon device such as described above in connection with FIG. 2. If the identity asserted by the beacon is invalid, the user device may determine that it is connected to an untrusted environment. Furthermore, if no beacon device is detected the user device may determine that it is connected to an untrusted environment as well. If the asserted identity is valid, the user device may determine that it is connected to a secure environment 416.

Figure 5:
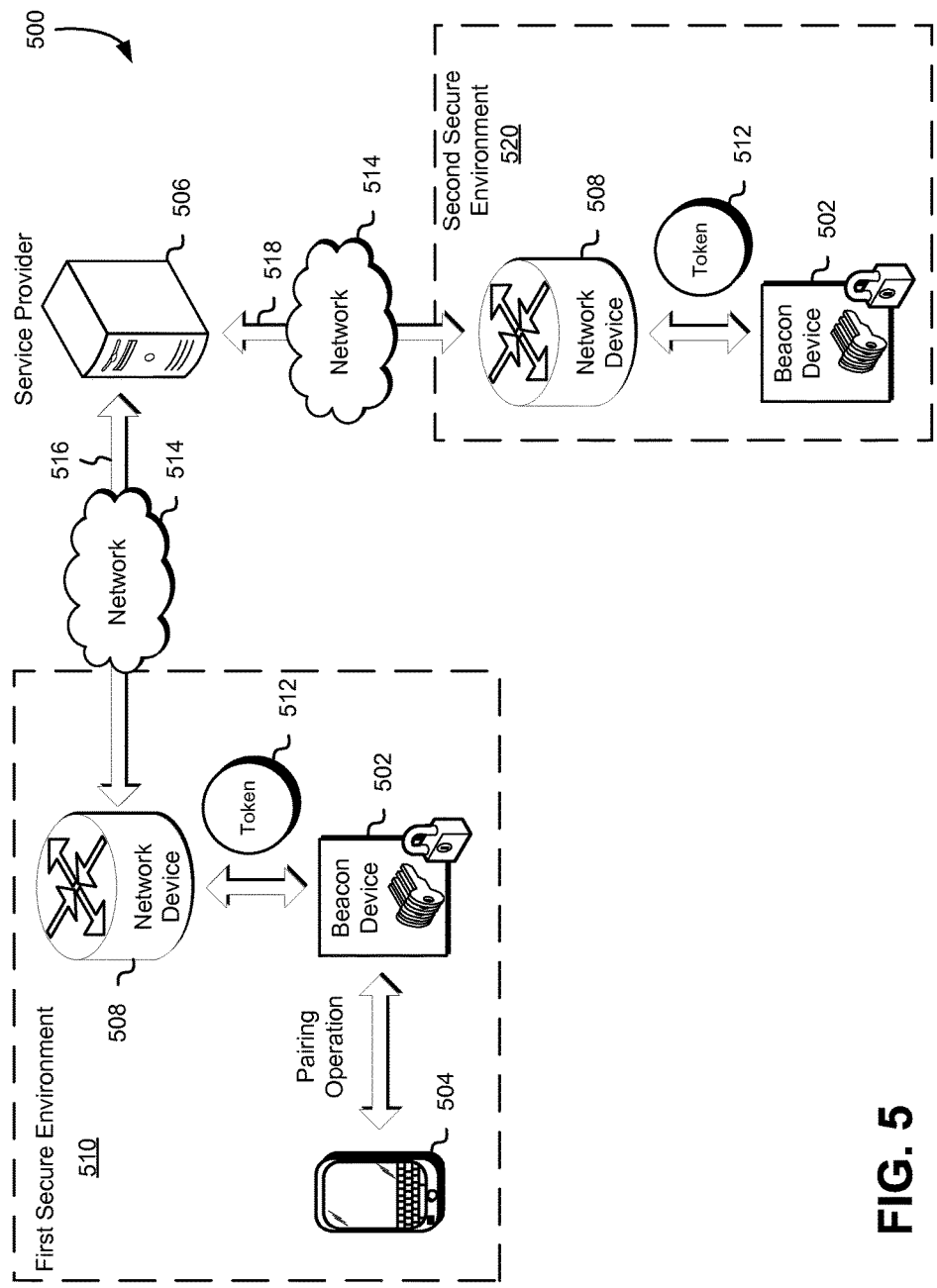
FIG. 5 is an illustrative example of a service provider migrating credential information between secure environments in accordance with one embodiment.

FIG. 5 illustrates an example environment where one or more computer systems running within environment 500, as well as the associated code running thereon, may provide enhanced security and accessibility features for a computing device within a different secure environment. A beacon device 502 may be used to establish a first secure environment 510 and a second secure environment 520. The beacon device in the first secure environment 510 and the second secure environment 520 may be the same device or may be different devices. For example, a user may connect the beacon device 502 to the user's home network and at some point in time later take the beacon device 502 to a different location and connect the beacon device 502 to a public network at the different location. The user may connect the beacon device 502 to a network device 508 of the first secure environment 510. At some point in time later the user may perform a pairing operation between the user device 504 and the beacon device 502.

During the pairing operation a connection may be established between the user device 504 and the beacon device 502. The user device 504 may provide the beacon device with a token 512 over the connection. The token 512 may be configured to provide access to one or more protected computing resources. The token 512 may be a shared secret between the user device 504 and the beacon device 502. The token 512 may also be credential information useable for accessing one or more services on a service provider 506 such as an OAuth protocol authentication token. Furthermore, the beacon device 502 may be configured to transmit the token 512 using connection 516 over a network 514 to the service provider 506. The network may be any suitable network as described above in connection with FIG. 1.

The service provider 506 may then use the token 512 to provision the beacon device 502 located in the second secure environment 520. The service provider 506 may transmit the token 512 to the beacon device using connection 518 over the network 514. The token 512 once received by the beacon device 502 in the second secure environment 520 may enable the beacon device to mutually authenticate to the user device 504 when the user device 504 is detected in the second secure environment 520. In various embodiments, the beacon device 502 in the first secure environment 510 may transmit the token 512 directly to the beacon device 502 in the second secure environment 520. The beacon device 502 in the second secure environment 520 may also request the token 512 from the service provider 506. The service provider may then obtain the token 512 from storage or from the beacon device 502 in the first secure environment 510 in order to provide the token 512 to the beacon device 502 in the second secure environment 520.

The beacon device 502 may also be configured to detect if the beacon device has been moved to a new location and determine security policies based at least in part on detecting that the beacon device 502 has been moved. The beacon device 502 may include a variety of different components configured to detect if the beacon device 502 has been moved including an accelerometer, GPS circuitry, a compass, a radio receiver or any other component suitable for determining location. Furthermore, the beacon device 502 may determine if the beacon device has moved based at least in part on information collected from the environment such as the IP address of the beacon device or network the beacon device is connected to. If the beacon device 502 has determined that the beacon device 502 have been moved to a new location, the beacon device 502 may modify one or more security policies at least until the beacon device 502 can establish that the environment is secure. For example, the beacon device 502 may require the user to provide authentication information after the beacon device 502 has been moved. In another example, the beacon device 502 may require the user device 504 to perform an additional pairing operation.

The beacon device 502 may not allow access to credential information and/or authentication information stored by the beacon device 502 once the beacon device 502 has been moved. After the beacon device 502 has determined that environment is secured, for example, by authenticating all of the devices on the local area network the beacon device is connected to, the beacon device 502 may allow access to the credential information and/or authentication information stored by the beacon device 502. The user may also provide an indication to the beacon device 502 and/or service provider 506 that the user will move the beacon device 502. If the user has indicated to the beacon device 502 that the user will move the beacon device 502, the beacon device 502 may adjust one or more security policies based at least in part on the indication. For example, if the user indicated to the beacon device 502 that the user will move the beacon device 502, the beacon device 502 allows a particular user device to access credential information and/or authentication information stored by the beacon device 502 but may deny access to other user devices.

Figure 6:
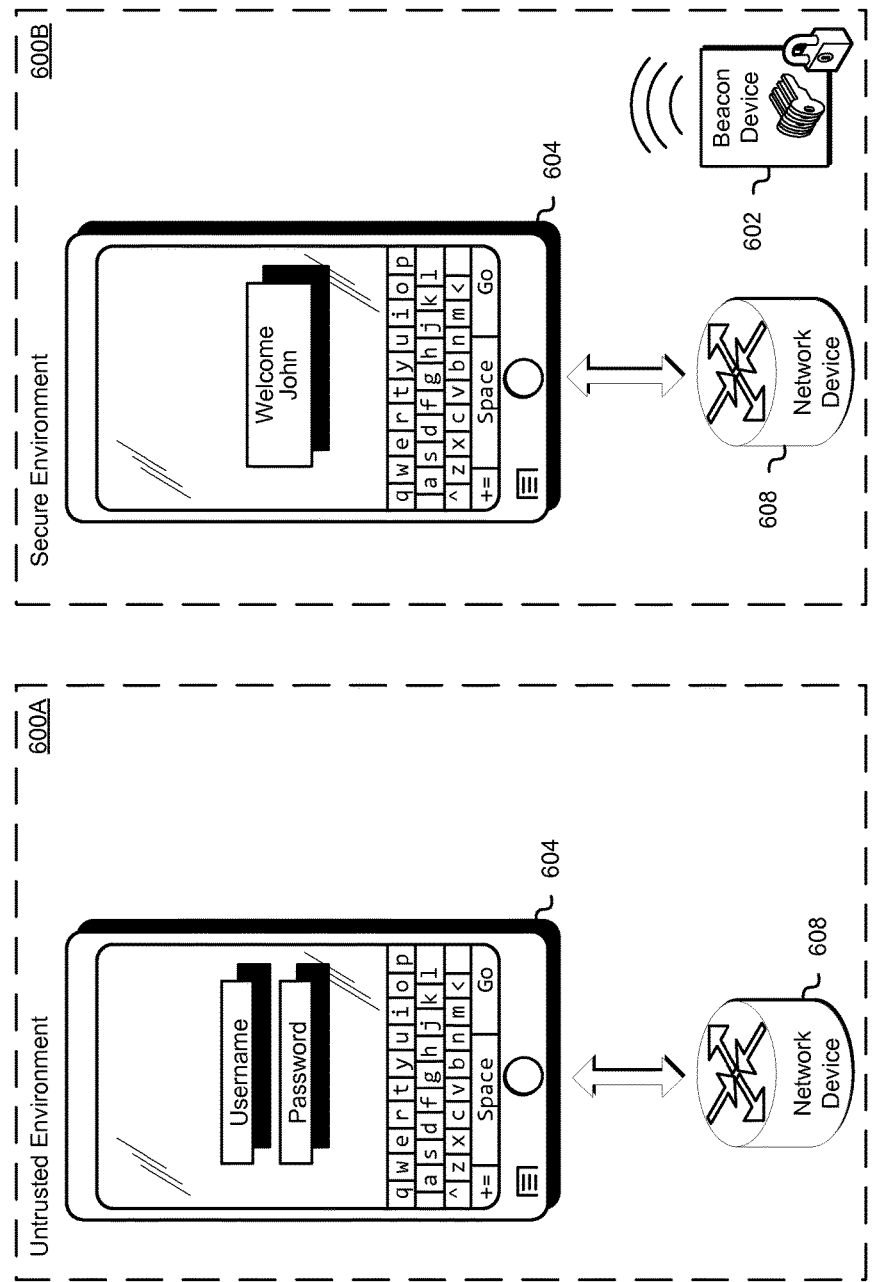
FIG. 6A is an illustrative example of a user device operating in a untrusted environment in accordance with one embodiment.
FIG. 6B is an illustrative example of a user device operating in a secure environment in accordance with one embodiment.

FIGS. 6A and 6B illustrate example environments where one or more computer systems running within environments 600A and 600B, as well as the associated code running thereon, may provide security features based at least in part on the availability of a beacon device 602. The beacon device 602 may maintain a set of policies configured to provide the security features and/or control the operation of the user device 604. Furthermore, the beacon device may obtain the set of policies based at least in part on a reference to information such as a URL. For example, a define set of policies may be maintained by a service provider and may be obtained by the beacon device using a URL indicating a location of the policies maintained by the service provider. A user device 604 may be configured to prompt for login information when in an untrusted environment 600A. The user device 604 may determine that the user device 604 is in the untrusted environment 600A based at least in part on a variety of different attributes including the unavailability of the beacon device, the GPS coordinates of the user device 604, the SSID of the network device 608 or any other information that may be collected corresponding to untrusted environment 660A. A variety of other policies may also be enforced by the user device 604 when the user device 604 is in the untrusted environment 600A. For example, the user device 604 may prevent one or more applications from executing on the user device 604, the user device 604 may block particular connection attempts on particular ports, the user device 604 may require additional authentication information to perform particular actions or other policy enforceable by the user device 604.

Turning now to FIG. 6B, the user device 604 may determine that the user device 604 is connected to a network in a secure environment 600B based at least in part on the availability of the beacon device 602. The user device 604 may detect the presence of the beacon device 602 and may attempt to exchange authentication information with the beacon device 602 in order to perform mutual authentication. The user device 604 and the beacon device 602 may exchange a shared secret as described above. In various embodiments, once the user device has been authenticated by the beacon device 602, the beacon device may enable the user device 604 to access the network device 608. For example, the user device 604 may not be able to connect to a wireless network implemented by the network device 608 until the user device has been authenticated by the beacon device. Furthermore, the beacon device may be implemented as a software application executed by the network device 608 or other device in the secure environment 600B.

Once the user device 604 has detected the beacon device 602 and determined that it is connected to a network in the secure environment 600B, the user device 604 and/or beacon device may enforce various policies. The beacon device 602 may issue cryptographically signed time stamps to the user device 604, the user device may then perform various operations based at least in part on the beacon device 602 having issued the user device 604 the signed time stamp. For example, the user device 604 may use the signed time stamp to obtain one or more tokens from a credential store operated by the beacon device 602. As illustrated in FIG. 6B, the user device may not require the user to enter credential information in order to access the user device 604. Additionally the user device 604 may not require additional authentication information to perform particular operations. For example, the user device may not require a pin or other authentication information to access a media streaming service or to complete an online purchase. The user device 604 may also be configured to communicate over various ports or using various protocols when connected to a network in the secure environment. For example, the user device 604 may be configured to accept all communications on port 25 when in the secure environment 600B and configured not to accept any communication on port 25 when in the untrusted environment 600A.

Figure 7:
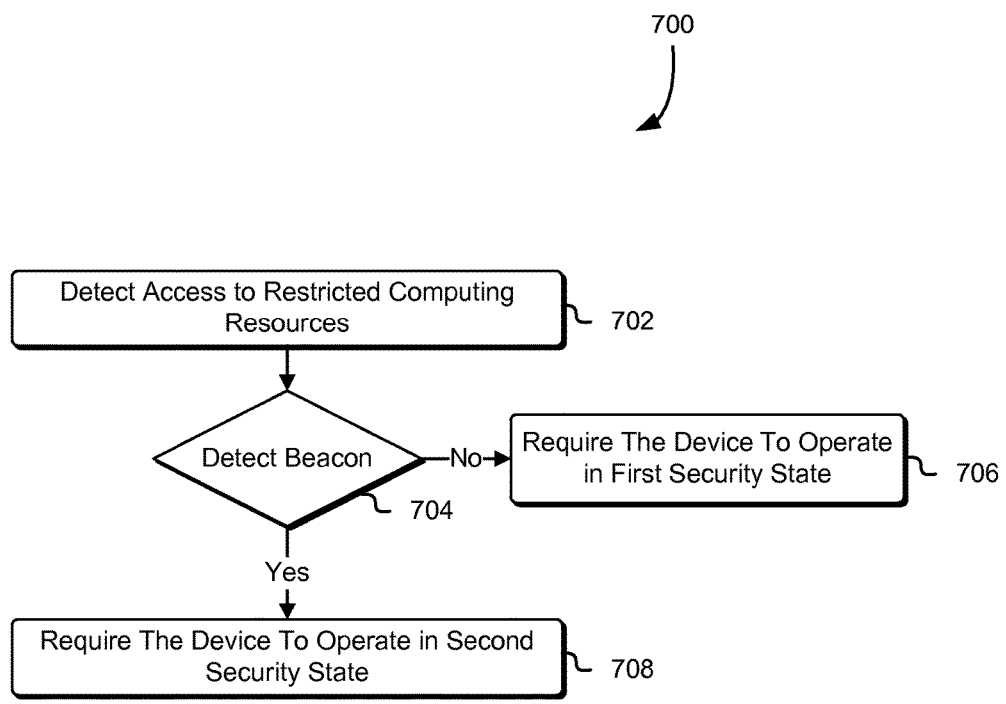
FIG. 7 is an illustrative example of a process for detecting if a user device is in a untrusted environment or a secure environment in accordance with one embodiment.

FIG. 7 shows an illustrative example of a process 700 which may be used to determine whether to require a user device to provide strong authentication or weak authentication in response to a request. The requirements for stronger or weaker authentication and/or security may be governed by a security state which may be associated with the user device in order to fulfill the requirement. For example, if the beacon device detects an untrusted device on the network, the beacon device may require other devices on the network to prevent connections on a particular port or range of ports. The process 700 may be performed by any suitable systems, such as by user device 104 and the beacon device 102 as described in connection with FIG. 1. Returning to FIG. 7, in an embodiment, the process 700 includes detecting a request to access a restricted computing resource 702. For example, the user may attempt to operate the user device as described above in connection with FIG. 6. In another example, the user may be attempting to access a service of the service provider as described above in connection with FIG. 1. The user device may then attempt to detect the availability of the beacon device 704.

If the beacon device is not available, the user device may determine that the user device is located in an untrusted environment and may implement one or more stronger security policies by at least prompting the user for strong authentication. For example, a stronger security policy may require the user to enter a username and password into a lock-screen of the user device before operating the user device as opposed to no lock-screen or a lock-screen that requires a personal identification number. The user device may be configured such that if the beacon device is not present, the user device is required to operate in a first security state 706. For example, the user device may determine that the beacon device is not present and may prompt the user for credential information in order to access one or more resources of the service provider. In another example, the user device may be configured such that a particular application may not be executed unless the beacon device is available and provides the user device with information required to execute the application. If the user device detects the beacon device 704, the user device may then implement one or more weaker security policies by at least not prompting the user for authentication information. For example, as described above, the user device may be configured such that the lock-screen or login-screen is not displayed by the user device when the beacon device is detected.

The user device may be configured such that if the user device detects that availability of the beacon device, the user device is required to operate in a second security state 708. The second security state may require less stringent security and/or authentication requirements than the first security state or may require less security for certain operations of the user device while maintaining or increasing security for other operations of the user device. For example, the user device may be configured such that when the beacon device is detected in a secure area of an office building the user device does not require login credentials to operate. However if the beacon device is detected in an untrusted area of the office build such as a reception area, lobby or other open area of the building, the user device requires login credentials to operate. Furthermore, this may be extended to particular applications or operations of applications. For example, the user device may be configured such that a web browser executed by the application will not request a particular webpage unless the beacon device is available.

Figure 8:
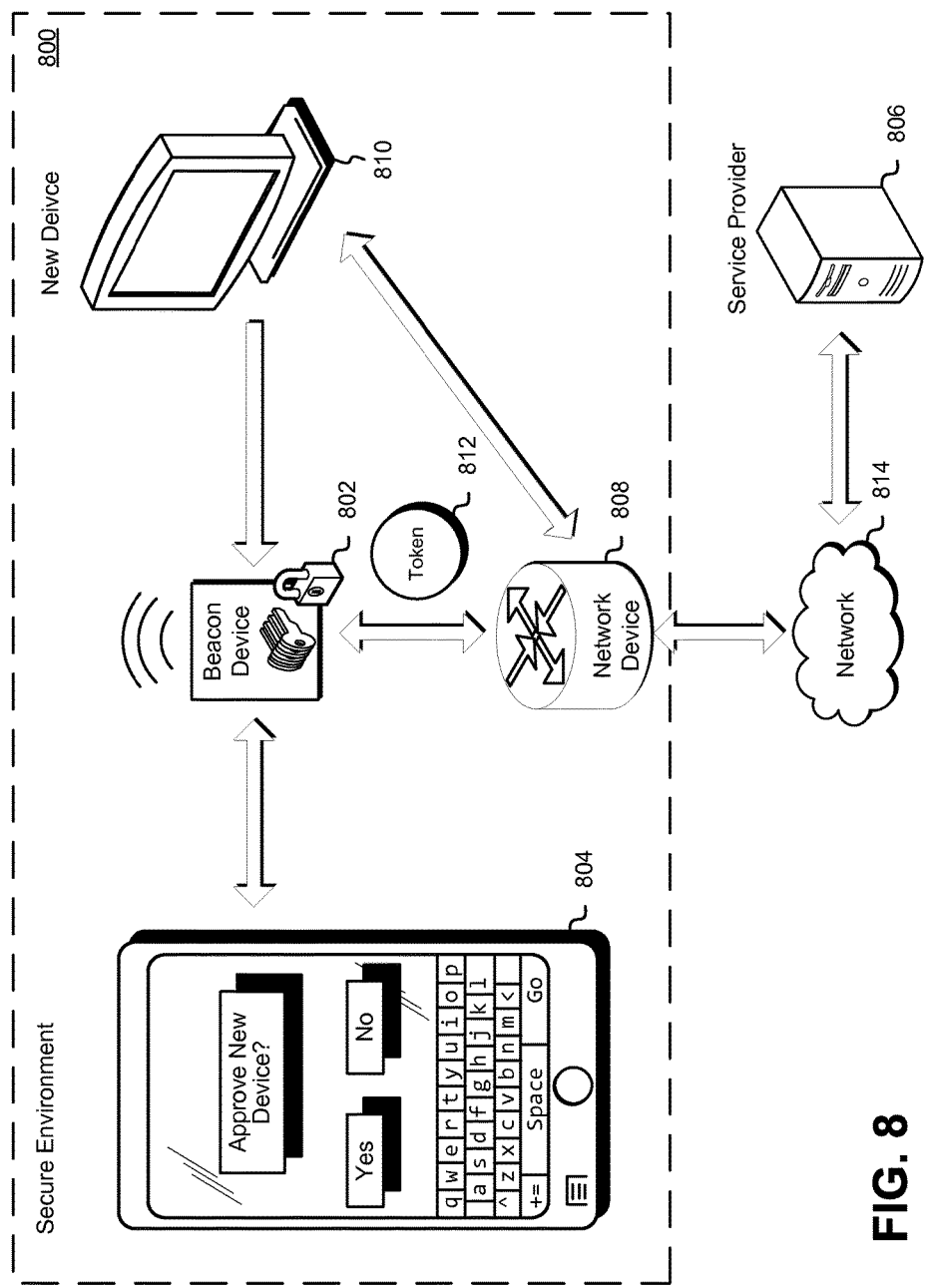
FIG. 8 is an illustrative example of a beacon device provisioning a new device in accordance with one embodiment.

FIG. 8 illustrates an example environment where one or more computer systems running within environment 800, as well as the associated code running thereon, may provision new devices without providing authentication information and/or credential information to the new devices. A beacon device 802 may provide a mechanism for storing credential information and/or authentication information for use with user devices connected to a network in a secure environment 800. The beacon device 802 or other entity, such as the service provider, may implement an interface exposed to the user and configured to receive and store credential information and authentication information from the user. For example, the user may enter credential for a particular service of the service provider 806 into an interface on the beacon device 802. The beacon device 802 may then store the credential information on behalf of the user and enable one or more user devices 804 to utilize the stored information in order to access restricted computing resources.

When a new user device 810 is connected to the network in the secure environment 800, the beacon device 802 may detect the new user device 810 and transmit information to one or more user devices 804 previously provisioned and/or paired with the beacon device 802. Furthermore, the user may specify a particular user device 804 as an administrator device configured to manage user devices connected to the network and/or beacon device 802 in the secure environment 800. As illustrated in FIG. 8, the beacon device 802 may transmit approval for provisioning the new user device 810 to the user device 804. The user may, using an input peripheral connected to the user device 804, accept or deny provisioning of the new user device 810. In various embodiments, the user device 804 may be in a different geographic location from the beacon device 802 and the new user device 810. For example, the user may be at the office and receive a notification when the new user device 810 attempted to connect to the user's home network in the secure environment 800.

If the user approves provisioning of the new user device 810, the beacon device 802 may provision the new user device 810 such that requests generated by the new user device 810 to access restricted computing resources of the service provider 806 contain the token 812. The token may be configured such that the token 812 may enable the requestor to access restricted computing resources as described above in connection with FIG. 5. The beacon device 802 may provision the new user device 810 such that the new user device 810 does not store the token 812. The new user device 810 may transmit a request to access one or more restricted computing resources to the beacon device 802. The beacon device 802 may then include the token 812 in the request and forward the request to the network device 808. The network device 808 may then transmit the request including the token 812 to the service provider 806. The service provider may then verify the token 812 and allow the new user device 810 access to the restricted computing resource. For example, the new user device 810 may be a smart television or set-top box. The user may then approve provisioning of the new user device 810 and the beacon device 802 may enable the new user device 810 to access one or more streaming media services without causing credential information for the one or more streaming media services to be stored within memory of the new user device 810.

Figure 9:
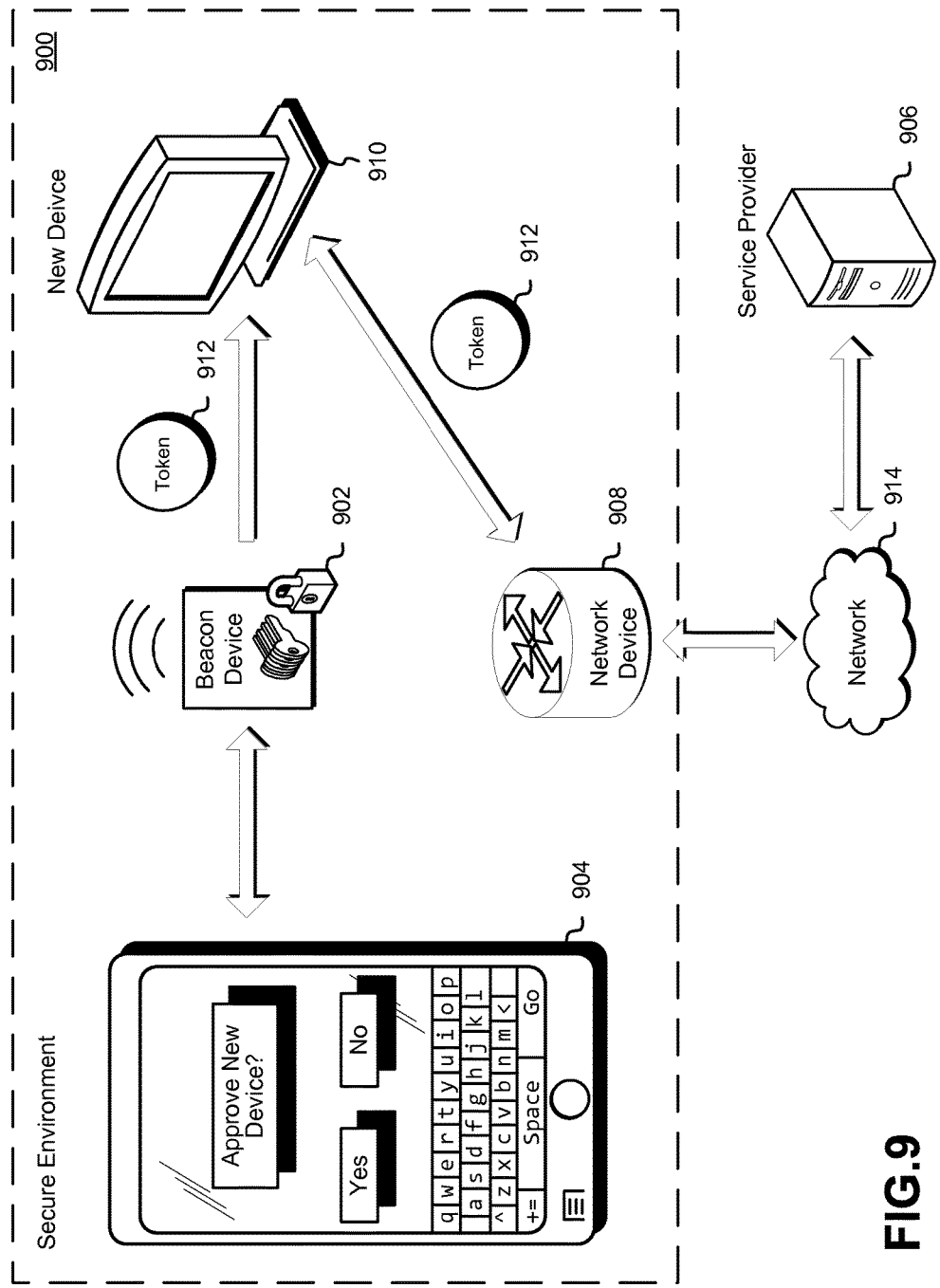
FIG. 9 is an illustrative example of a beacon device provisioning a new device in accordance with one embodiment.

FIG. 9 illustrates an example environment where one or more computer systems running within environment 900, as well as the associated code running thereon, may provision new devices by at least providing authentication information and/or credential information to the new devices. A beacon device 902 may provide a mechanism for storing credential information and/or authentication information for use with user devices connected to a network in a secure environment 900. Furthermore, the beacon device 902 may provide a mechanism for roaming or otherwise forwarding credential information and/or authentication information from a user device 904 to a new user device 910. The credential information may include user names and passwords corresponding to restricted computing resources. The authentication information may correspond to ownership of a particular computing resource or possession of secret information. For example, the authentication information may include access rights to a particular restricted computing resource. In another example, the authentication information may include a shared secret generated during a pairing operation as described above.

The user may select particular information to be transmitted to the new user device 910 or the user may be presented with the choice of whether to approve the new user device 910 thereby granting the new user device 910 a certain set of privileges. If the user approves the new user device 910 for provisioning, the beacon device 902 may provide the new user device 910 with a token 912 configured to enable the new user device 910 to access one or more restricted computer resources such as the network device 908 or computing resources of the service provider 906. For example, the beacon device may receive an indication from the user device 904 of the user's approval of the new user device 910 and may prompt the user for additional information, such as the user's password, in order to provide the additional information in the token 912.

The new user device 910 may store the token 912 in the memory of the new user device such that the token 912 may be used in order to access restricted computing resources. In various embodiments, the new user device 910 is configured to include authentication information useable for authenticating the new user device 910 to the beacon device 902. For example, if the user purchases the new user device 910 from the service provider 906, the service provider may include authentication information in the memory of the new user device 910 prior to providing the user with the new user device. Furthermore, the new user device 910 may be configured to request certain information from the beacon device 902 once the new user device has been approved. For example, once the new user device 910 has received an indication that the user has given the beacon device 902, the new user device 910 may request network information corresponding to the network device 908 such that the new user device 910 can reach the service provider 906 over the network 914.

Figure 10:
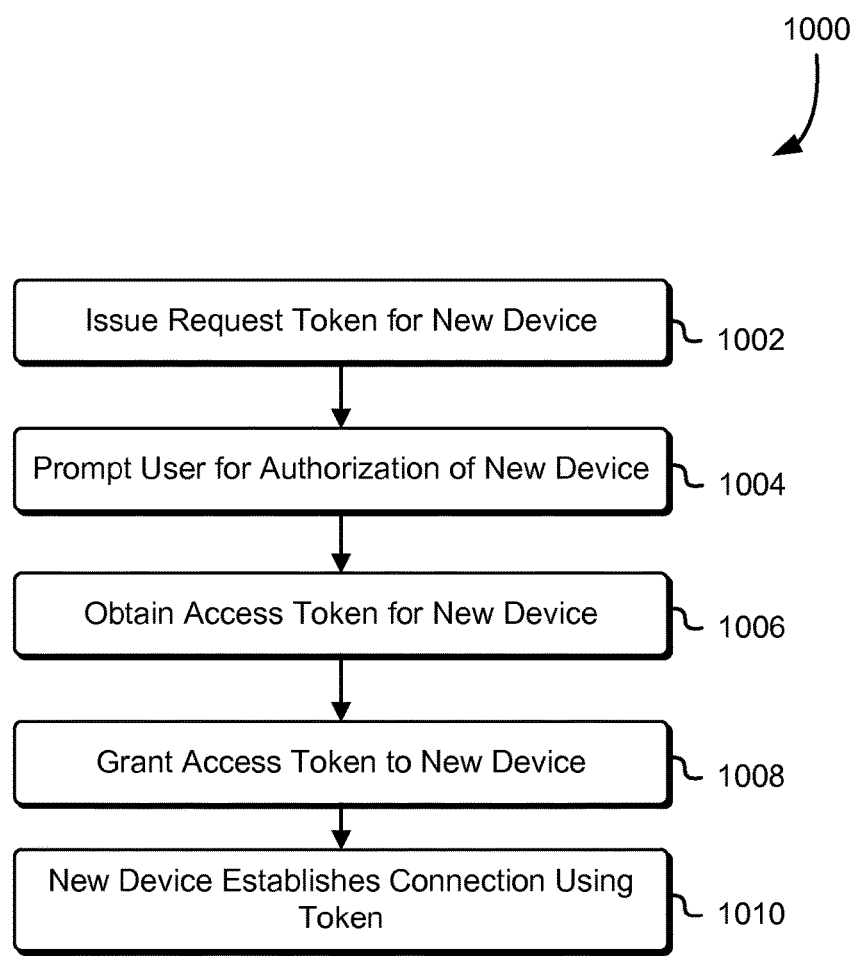
FIG. 10 is an illustrative example of a process for provisioning a new device in accordance with one embodiment.

FIG. 10 shows an illustrative example of a process 1000 which may be used to provision new devices in a secure environment by at least providing the new device with a token. The process 1000 may be performed by any suitable systems, such as by user device 804 and the beacon device 802 as described in connection with FIG. 8. Returning to FIG. 10, in an embodiment, the process 1000 includes issuing a request token for a new device 1002. For example, the beacon device may detect the presence of a new user device on the local area network located with the secure environment and issue a request to one or more other user devices previously registered with the beacon device. In another example, the new user device may connect to a provisioning network implemented by the beacon device using a particular SSID. Once connected to the provisioning network, the new user device may transmit a request to the beacon device for the token.

The beacon device may then prompt the user for authorization to provision the new device 1004. The beacon device may prompt the user as described above in connection with FIGS. 8 and 9. The beacon device may transmit a notification to one user device but may receive approval to provision the new device from another user device. For example, the beacon device may transmit a notification to the user's smartphone and may receive an indication of the user's approval from the user's laptop computer. Once the beacon device has received approval to provision the new device, the beacon device may obtain an access token for the new device 1006. The beacon device may obtain the access token from a data store, the data store may be contained within the beacon device or may be a remote data store maintained by the service provider. The beacon device may also modify the obtained token for use with the particular user device. For example, the beacon device may add an identifier of the user device to the token. The beacon device may also obtain the token from another user device in the secure environment or may prompt the user to provide information suitable for generating the token.

The beacon device may then grant the new device access to the token 1008. In some embodiments, the beacon device may transmit the token to the new user device. The beacon device may also allow the new device to access the token in order to generate access request for restricted resources. For example, the beacon device may be configured to provide the new device with a limited token useable for accessing the restricted resources, such as a token valid for only a particular request. Once the new user device has been granted access to the token, the new user device may establish a connection using the token 1010. As described above in connection with FIG. 9, the new user device may generate a request to access a restricted computing resource including the token.

Figure 11:
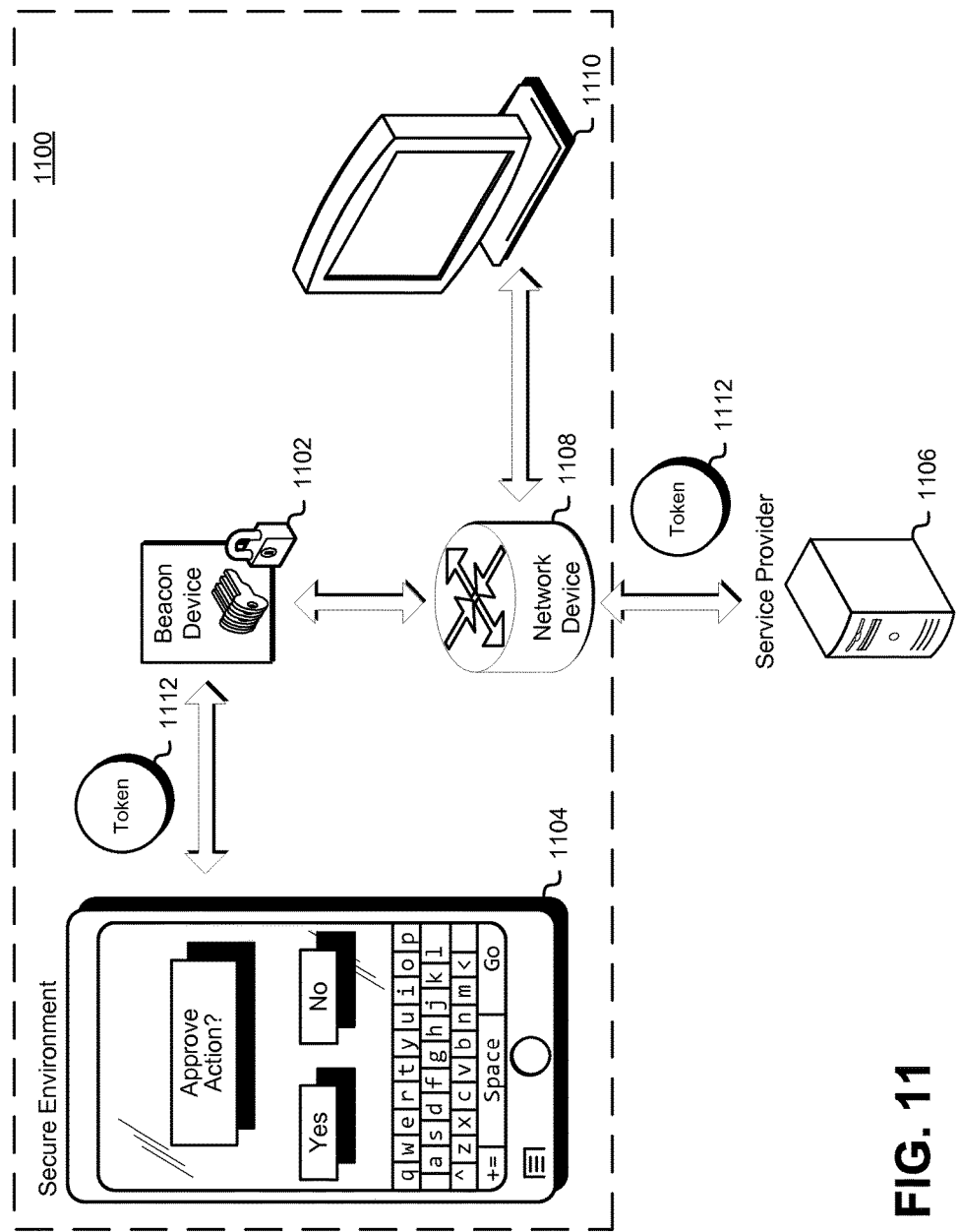
FIG. 11 is an illustrative example of approving an operation of a user device with another user device in accordance with one embodiment.

FIG. 11 illustrates an example environment where one or more computer systems running within a secure environment 1100, as well as the associated code running thereon, may approve an action or operation of a computing device. A first user device 1110 may request access to a restricted computing resource of a service provider 1106. The access may require approval from a user. The user may indicate approval using a second user device 1104. For example, a user may wish to access an online gaming service operated by the service provider 1106 using the first user device 1110. The first user device 1110 may be configured such that in order to access the service provider the first user device 1110 requires a token 1112 indicating that the operations required to access the service provider are approved. One or more other devices in the secure environment may also be configured to prevent access to the service provider 1106 unless the user device requesting the access has a token 112 indicating that the access is approved.

The beacon device may implement a variety of different policy rules requiring approval for various operations. In various embodiments, the policy rules indicate whether the operations are approved without requiring an indication from the user. For example, the user may specify in the policy rules that access to the service provider is only allowed during particular hours. The beacon device 1102 may prompt the user for approval of one or more operations of devices in the secured environment 1100. For example, the beacon device 1102 may prompt the user to approve a purchase request made by a particular user device. The beacon device may transmit a request to an authoritative user device, as described above, in order to determine whether to allow the user device to complete the operation.

If the user indicates that the operation is approved the beacon device may forward the indication to the service provider 1106 and the service provider 1106 may grant access to the restricted resource.

The first user device 1110 may attempt to purchase a media file from the service provider 1106. The media file may be restricted such that a passcode is required in order to complete the purchase. The beacon device 1102 may detect the operation of the first user device 1110 and transmit information to the second user device 1104 corresponding to the actions the first user device 1110 is attempting to perform. The user may approve the action through an input peripheral of the second user device 1104. In various embodiments, the beacon device 1102 stores a copy of the user's passcode and is configured to transmit the passcode to the service provider in order to enable the first user device to access the media file without requiring the user to enter the passcode. The beacon device 1102 may prompt the user for the passcode. Once the service provider 1106 has received the passcode, the service provider 1106 may issue a token 112 to the first user device configured to enable the first user device 1110 to access the requested media file.

Figure 12:
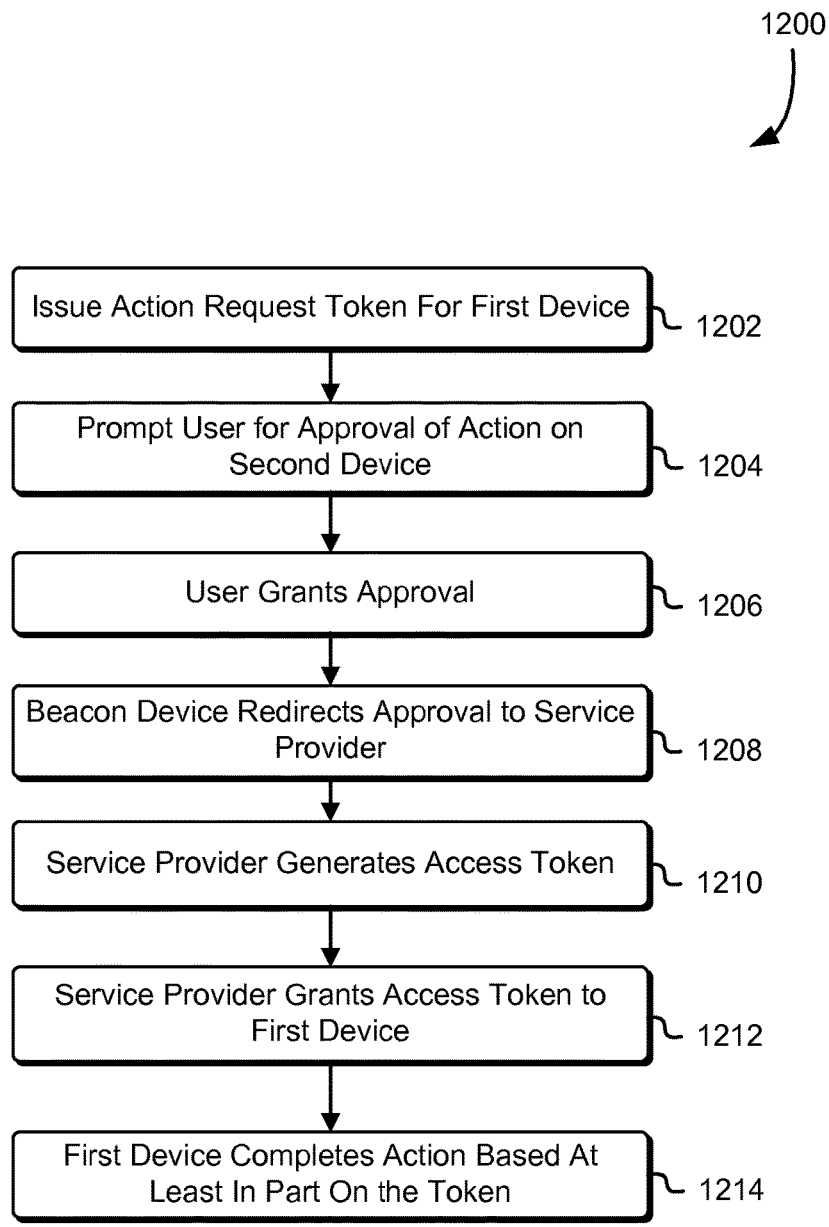
FIG. 12 is an illustrative example of a process for approving an operation of a user device with another user device in accordance with one embodiment.

FIG. 12 shows an illustrative example of a process 1200 which may be used to approve the operations of a first device based at least in part on approval received from a second device in a secure environment. The process 1200 may be performed by any suitable systems, such as by the first user device 1110 and the second user device 1104 as described in connection with FIG. 11. Returning to FIG. 12, in an embodiment, the process 1200 includes issuing an action request token for a first user device 1202. The action request token may be a token indicating that a particular user computing device is attempting to perform a particular action that requires approval. The token may be issued by the user device attempting to perform the action, by the beacon device, by a service the user device is attempting to interact with or any other computing device capable of obtaining information corresponding to the operations of a user device. The actions may include any operation executable by a user device such as executing an application, accessing a network or accessing a device attached to the network. The token may be configured to grant access to the network, a specific file and/or document, a corporate network or corporate computing resources or other restricted computing resource.

The beacon device may then prompt the user for approval on a second user device 1204. For example, the beacon device may transmit a notification to the user's smartphone and the first user device is attempting to perform a particular action. The user may grant approval 1206 for the particular operation indicated by the beacon device. The user may grant approval using a different computing device than the computing device that received the notification for the beacon device. In numerous variations to process 1200, the user may grant approval for the action directly to the service provider. Once the beacon device has received an indication from the user of whether the action is approved, the beacon device may redirect the indication to the service provider. The approval may include a passcode or other authorization as described above in connection with FIG. 11. The beacon device may process or otherwise modify the approval before redirecting the approval to the service provider. For example, the beacon device may include a copy of the user passcode or other authorization information retrieved from a password stored in the beacon device.

Once the service provider receives an indication of the user's approval, the service provider may generate an access token 1210. The access token may be configured to allow the first user device to complete the attempted action. The service provider may then grant the access token to the first user device 1212. The service provider may grant the access token to the first user device by directly or indirectly providing access to the token. For example, the token may remain on computing resources of the service provider and the service provider may grant the first user device access to restricted resources based at least in part on the token. In another example, the service provider may transmit the token to the beacon device and the beacon device may enable the first user device to access the token. The first device may then complete the requested action based at least in part on the token 1214. For example, the first user device may access a media file based at least in part on the token.

Figure 13:
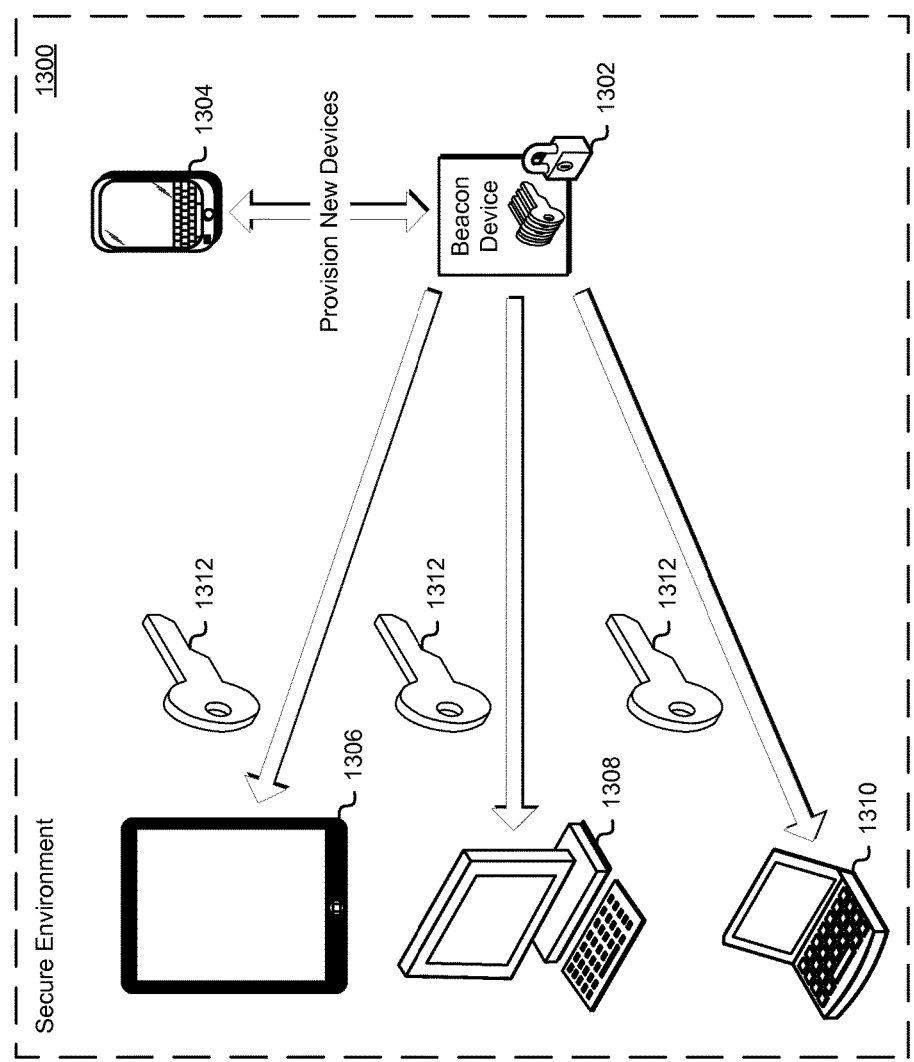
FIG. 13 is an illustrative example of a beacon device providing an authentication information store in accordance with one embodiment.

FIG. 13 illustrates an example environment where one or more computer systems running within a secure environment 1300, as well as the associated code running thereon, may receive credential information and/or authentication information from beacon device 1302 based at least in part on an indication received from a user. A user may provide an indication of one or more particular user devices and/or particular information to be provided to the particular user devices selected. The user may provide the indication using a user device 1304. The user device may connect to an interface implemented by the beacon device 1302. The interface may be configured to allow the user to indicate particular credential information or authentication information to provision the new user device to include. The new user device may include a variety of different devices including a tablet 1306, a desktop computer 1308 and a laptop 1310. The user device may be previously registered and/or paired with the beacon device 1302 or may be registered and/or paired with the beacon device 1302 as part of the provisioning process.

The beacon device 1302 may receive an indication of the information to the user devices for provisioning and may establish a connection with the user device capable of transmitting the information securely. The beacon device may then transmit one or more keys 1312 to the user devices, the keys capable of authenticating the user devices. The keys 1312 may be a shared secret generated during a pairing operation between the user device 1304 and the beacon device 1302. The shared secret may be capable of mutually authenticating the one or more other devices and the beacon device such that the devices may determine whether the environment is secure. In various embodiments, the beacon device transmits password hashes to the user device, the password hashes usable as credentials for accessing restricted computing resources. The user devices may then store the information received from the beacon device 1302.

Figure 14:
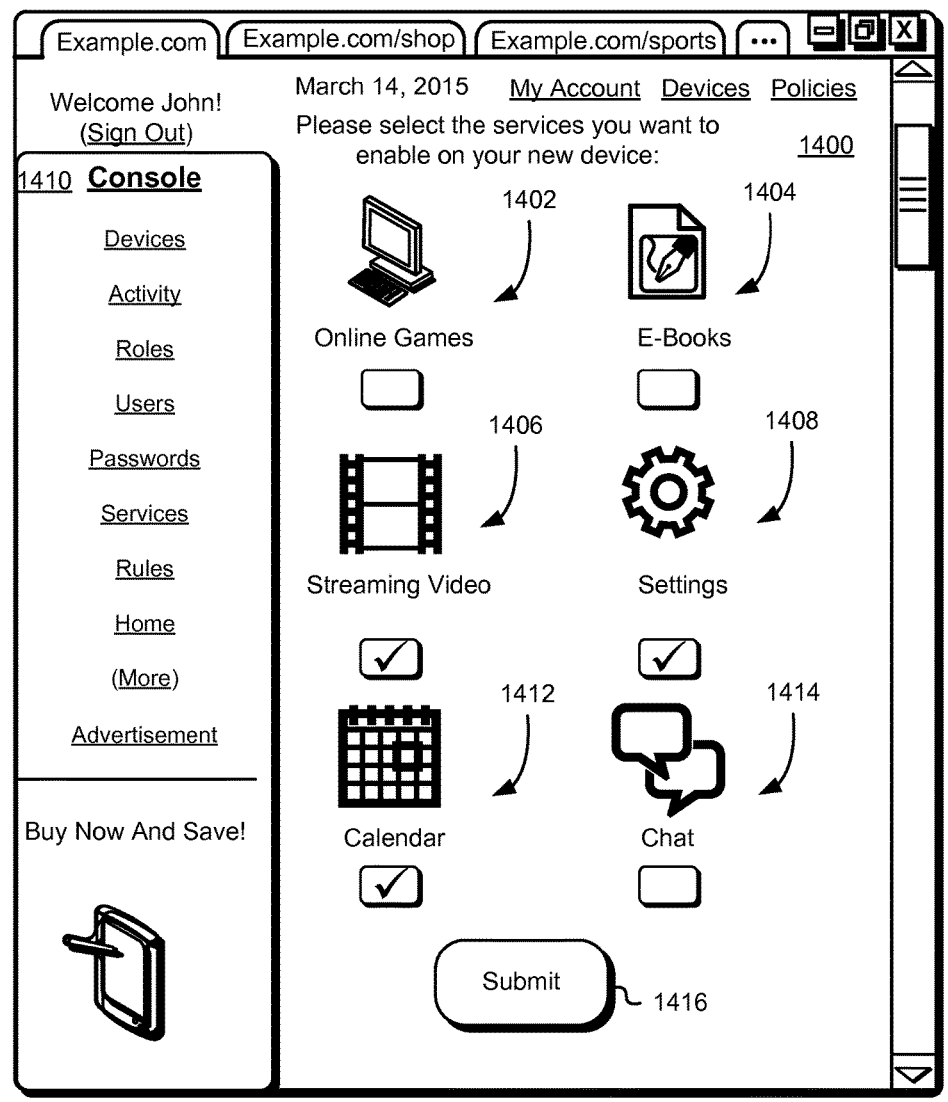
FIG. 14 is an illustrative example of a webpage for selecting information useable to provision a new device in accordance with one embodiment.

FIG. 14 shows a webpage 1400 which may be displayed by an application executed by a user device enabling a user to interact with a beacon device located in a secure environment. As illustrated in FIG. 14, the webpage 1400 includes various graphical user interface elements that enable navigation throughout the interface of the beacon device of which the webpage 1400 is a part. In various embodiments, the webpage 1400 is implemented by a service provider and the service provider is responsible for receiving user input into the webpage 1400 and transmitting the received input to the beacon device. The webpage 1400 may be displayed by various applications, such as a mobile application or web browser. In this example, the webpage 1400 includes various navigational features. For instance, on the left-hand side of the webpage 1400, various links 1410 may link to one or more other webpages that contain additional content corresponding to management of the beacon device. The other management pages may enable the user to control various attributes of the beacon device and the secure environment. In this example, the links appear as textual words which enable the links to be selected using an appropriate input device such as a keyboard, mouse, touch-screen or other input device. Selection of one of the links 1410 may cause an application displaying the webpage 1400 to submit, pursuant to a URL associated with the selected link by the programming of the webpage 1400, an HTTP request for the content associated with the link to the beacon device or a server that provided the webpage 1400 or another server. In this example, the webpage 1400 also includes a graphical user element configured as a "submit" button 1416. The submit button 1416 may be a graphical user interface element of the webpage 1400 where the underlying code of the webpage 1400 is configured such that selection by an input device of the submit button 1416 causes information corresponding to the selection of credentials by the user to be transmitted to one or more user devices.

The webpage 1400 may also include a graphical user element configured as radio buttons or check boxes corresponding to credentials or other information useable in receiving the user selection of information to include in provisioning new user devices. The radio button may be a graphical user interface element of the webpage 1400 where the underlying code of the webpage 1400 is configured such that selection by an input device of one or more of the radio buttons causes information corresponding to the credentials displayed on the webpage 1400 to be recorded or otherwise stored for use by the beacon device. In this example, the webpage 1400 contains six credentials useable for identifying the user to an application or service for selection by the user, online games 1402, electronic books 1404, streaming video 1406, settings 1408, calendar 1412 and chat 1414. The credentials may be selected based at least in part on information associated with the user's account and information received from the user as a result of a pairing operation with the beacon device. For example, the credentials may be selected based at least in part on services associated with a user account corresponding to authentication information received from the user device. Further, the credentials displayed webpage 1400 may be replaced with other information the user may select and which may be used by the beacon device to provision one or more other devices including application information, parental controls, security information, location information or user information.

Furthermore, the credentials displayed in the webpage 1400 may correspond to services offered by the service provider or one or more other organizations. For example, the services may include an installation service, delivery service or other service. The credentials displayed on the webpage 1400 may contain a presentation of the credential such as a graphical representation of the service or application associated with the credential, which could be text and/or a drawing, photograph, description, identification number, trademark, video clip, audio clip or any other representation capable of representing the items. The user may select the credentials using radio buttons or by selecting the image associated with the credential. Other variations of the user interface displayed in FIG. 14 may be used in accordance with the present disclosure. For example, drop-down menus may be included in the user interface to enable the user to select a particular user account or information associated with a user account to include when provisioning the new devices.

Figure 15:
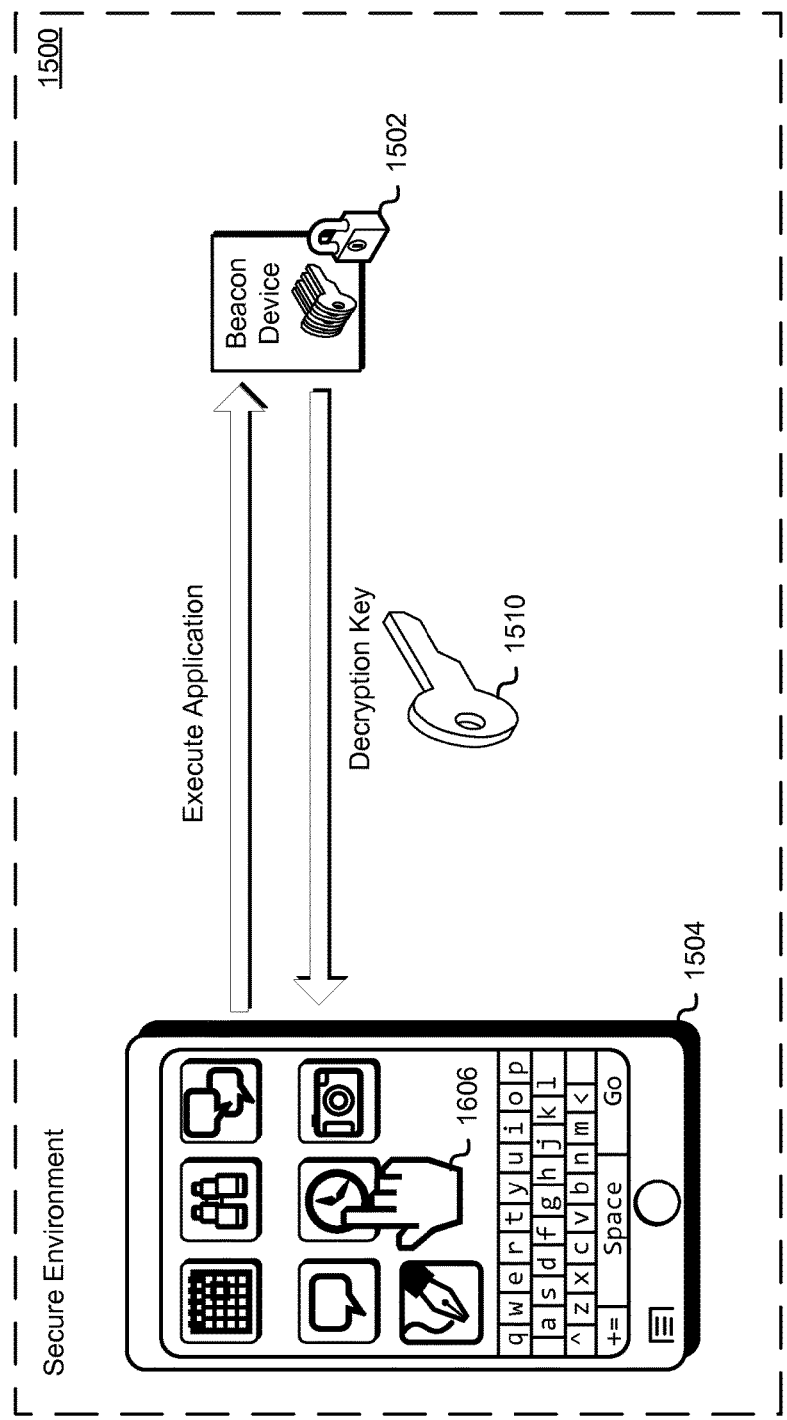
FIG. 15 is an illustrative example of a beacon device enabling execution of an application in accordance with one embodiment.

FIG. 15 illustrates an example environment where one or more computer systems running within a secure environment 1500, as well as the associated code running thereon, may enable execution of an encrypted application based at least in part on the user device executing the application being located in the secure environment. The beacon device 1502 may enable the user to encrypt all or a portion of memory of a user device using a key stored in the beacon device 1502 such that the memory may not be accessible unless the user device is located in the secure environment and the beacon device 1502 is accessible. For example, the user may indicate one or more applications to be encrypted using the interface described above. Furthermore, the user may indicate additional information that may indicate conditions under which the particular application may be executed such as a time of day, a particular device or a particular user. The beacon device or application executed by the user device 1504 may encrypt the indicated applications. Furthermore, the user may indicate particular areas of memory or files to be encrypted as well.

The encrypted application may reside in the memory of the user device 1504. The user may select an icon associated with an application using a cursor 1506. Selection of the icon may cause the user device 1504 to attempt to execute the application associated with the icon. The icon may be a graphical representation of information associated with the application. A loader application executed by the user device 1504 may be responsible for retrieving the decryption key 1510 from the beacon device 1502. The loader application may load the encrypted executable of the application into memory of the user device 1502 and decrypt the executable with the decryption key 1610 such that the application may be executed by the user device 1504. Once the application is terminated the loader application may encrypt the application with the key 1510 and destroy the key 1510 or otherwise make the key 1510 unavailable such as by overwriting the key with other data. In various embodiments, after execution of the application by user device 1504 the beacon device provides the user device 1504 with a new key to encrypt the application.

Figure 16:
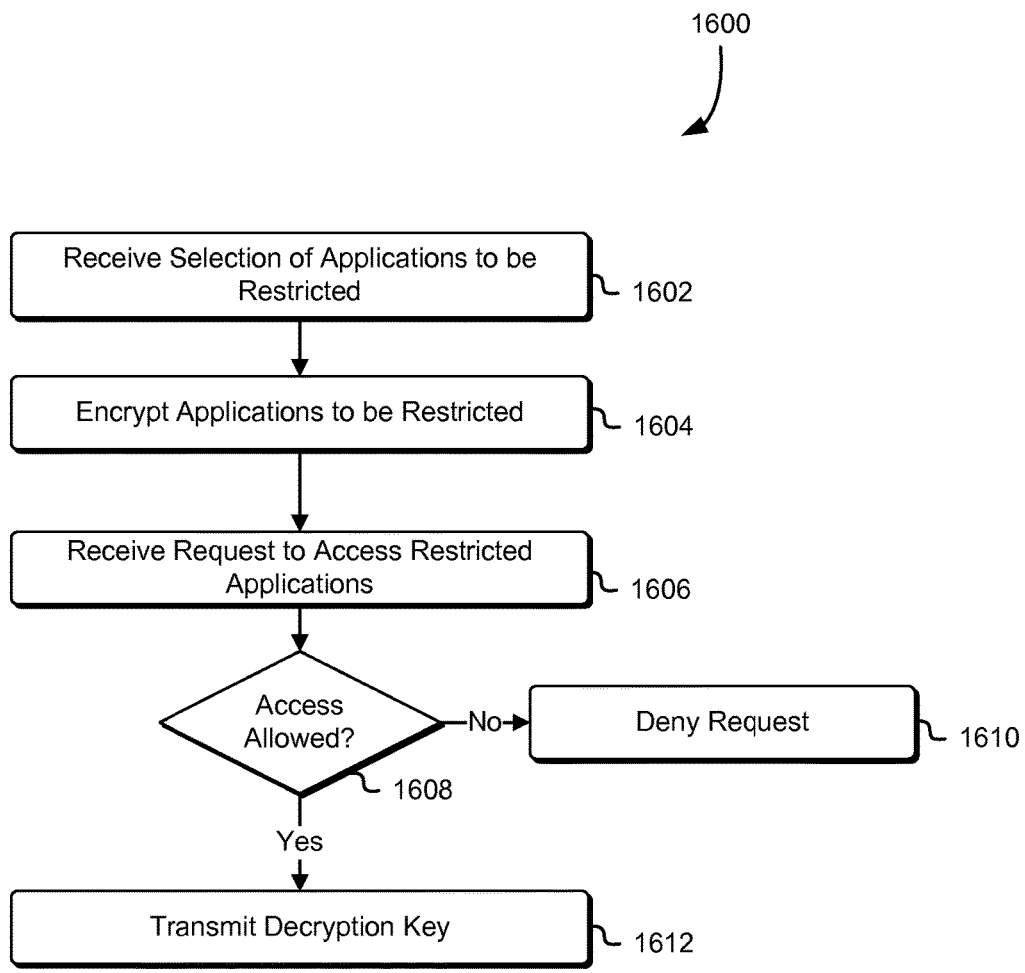
FIG. 16 is an illustrative example of a process for enabling execution of an application by a beacon device in accordance with one embodiment.

FIG. 16 shows an illustrative example of a process 1600 which may be used to encrypt and decrypt applications for execution in a secure environment. The process 1600 may be performed by any suitable systems, such as by the user device 1504 and the beacon device 1502 as described in connection with FIG. 15. Returning to FIG. 16, in an embodiment, the process 1600 includes receiving a selection of applications to be restricted 1602. The user device may indicate the selection using an interface as described above. The user may also indicate the selection using a client application executing on the user device. The beacon device may then cause the application to be encrypted such that the execution of the applications is restricted 1604. As described above, additional policy restrictions may be indicated by the user and enforced by the beacon device.

At some point in time after the applications have been restricted, the beacon device may receive a request to access the restricted applications 1606. In various embodiments, the user device is configured such that the user device is incapable of attempting to execute the application and/or generating a request to the beacon device to access the application unless the beacon device is detectable by the user device. Once the beacon device has received the request, the beacon device may determine whether access is allowed 1608. The beacon device may check a policy store or rules engine to determine if the attempted access is allowed based at least in part on a policy indicated by the user. If access is not allowed the beacon device may deny the request 1610 and transmit an indication to the user device that the request has been denied. If access is allowed the beacon device may transmit the decryption key 1612 to the user device. The decryption key may be configured to enable the user device to access the application.

Figure 17:
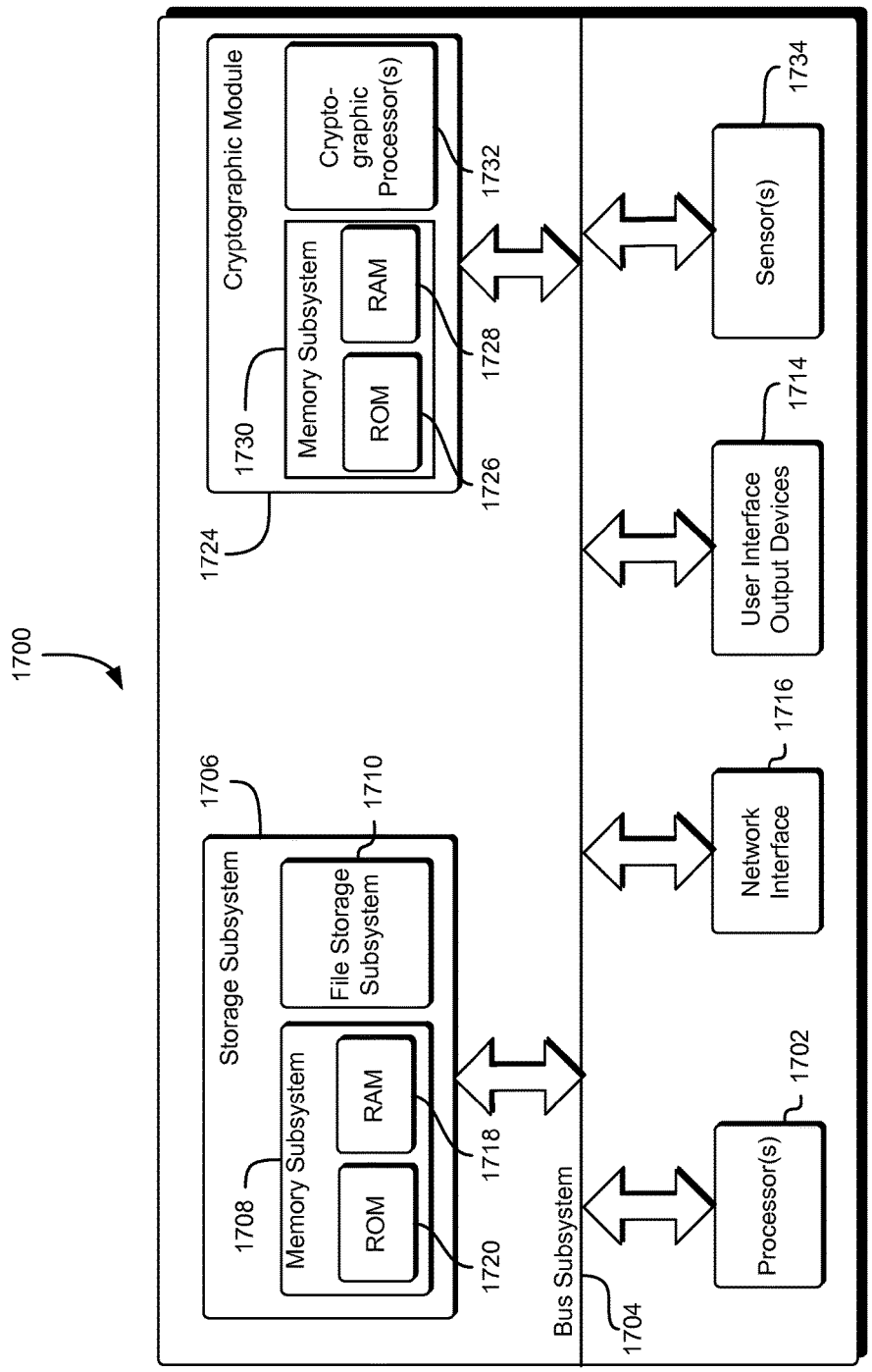
FIG. 17 shows an illustrative example of components of a beacon device in accordance with one embodiment.

FIG. 17 is an illustrative, simplified block diagram of an example device 1700 that may be used to practice at least one embodiment of the present disclosure. In various embodiments, the device 1700 may be used to implement any of the systems illustrated herein and described above. For example, the device 1700 may be used to implement a beacon device, in accordance with various embodiments. As shown in FIG. 17, the device 1700 may include one or more processors 1702 that may be configured to communicate with and are operatively coupled to a number of peripheral subsystems via a bus subsystem 1704. These peripheral subsystems may include a storage subsystem 1706, comprising a memory subsystem 1708 and a file storage subsystem 1710, one or more user interface output devices 1714, a network interface subsystem 1716, a cryptographic module 1724, comprising a memory subsystem 1730 and one or more cryptographic processors 1732. The peripheral subsystems may also include one or more sensors 1734. Such sensors may include, but are not limited to, GPS sensors, accelerometers, temperature sensors and others.

The bus subsystem 1704 may provide a mechanism for enabling the various components and subsystems of device system 1700 to communicate with each other as intended. Although the bus subsystem 1704 is shown schematically as a single bus, alternative embodiments of the bus subsystem may utilize multiple busses.

The network interface subsystem 1716 may provide an interface to other device systems and networks. The network interface subsystem 1716 may serve as an interface for receiving data from and transmitting data to other systems from the device system 1700. For example, the network interface subsystem 1716 may enable transmission of authentication objects and other information, such as electronic requests to access a system (e.g., receive a webpage) and may enable receipt of responses to the requests, such as webpages or other information. The network interface subsystem 1716 may also facilitate the receipt and/or transmission of data on other networks, such as an organizations intranet and/or other networks described below.

User interface output devices 1714, if any, may include a display subsystem or non-visual displays, such as audio and/or tactile output devices, etc. Generally, the output devices 1714 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 1700. The output device(s) 1714 may be used, for example, to present user interfaces to facilitate user interaction with applications performing processes described herein and variations therein, when such interaction may be appropriate, such as presenting the user with authentication information used during a pairing operation. As described above, the beacon device may display a QR code which may be captured by one or more sensors of a user device in order to complete a pairing operation. While a device 1700 with user interface output devices is used for the purpose of illustration, it should be noted that the device 1700 may operate without an output device, such as when the device 1700 is operated in a server rack and, during typical operation, an output device is not needed.

The storage subsystem 1706 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 1706. These application modules or instructions may be executed by the one or more processors 1702. The storage subsystem 1706 may additionally provide a repository for storing data used in accordance with the present disclosure. The storage subsystem 1706 may comprise a memory subsystem 1708 and a file/disk storage subsystem 1710.

The cryptographic module 1724, which may be a trusted platform module (TPM), includes a memory subsystem 1730, including a main random access memory (RAM) 1728 for storage of instructions and data during program execution and a read only memory (ROM) 1726, in which fixed cryptographic information may be stored, such as a hardware secret stored securely within the device 1700 so as to be non-exportable (i.e., inaccessible through any call to the cryptographic module 1724). The cryptographic module 1724, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1700 may also store cryptographic keys in RAM 1728 and/or processor registers for temporary cryptographic processing. The cryptographic information stored in memory may be used in combination with cryptographic information obtained via the network interface 1716 and/or one or more of the user interface input devices 1712. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 1724. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 18:
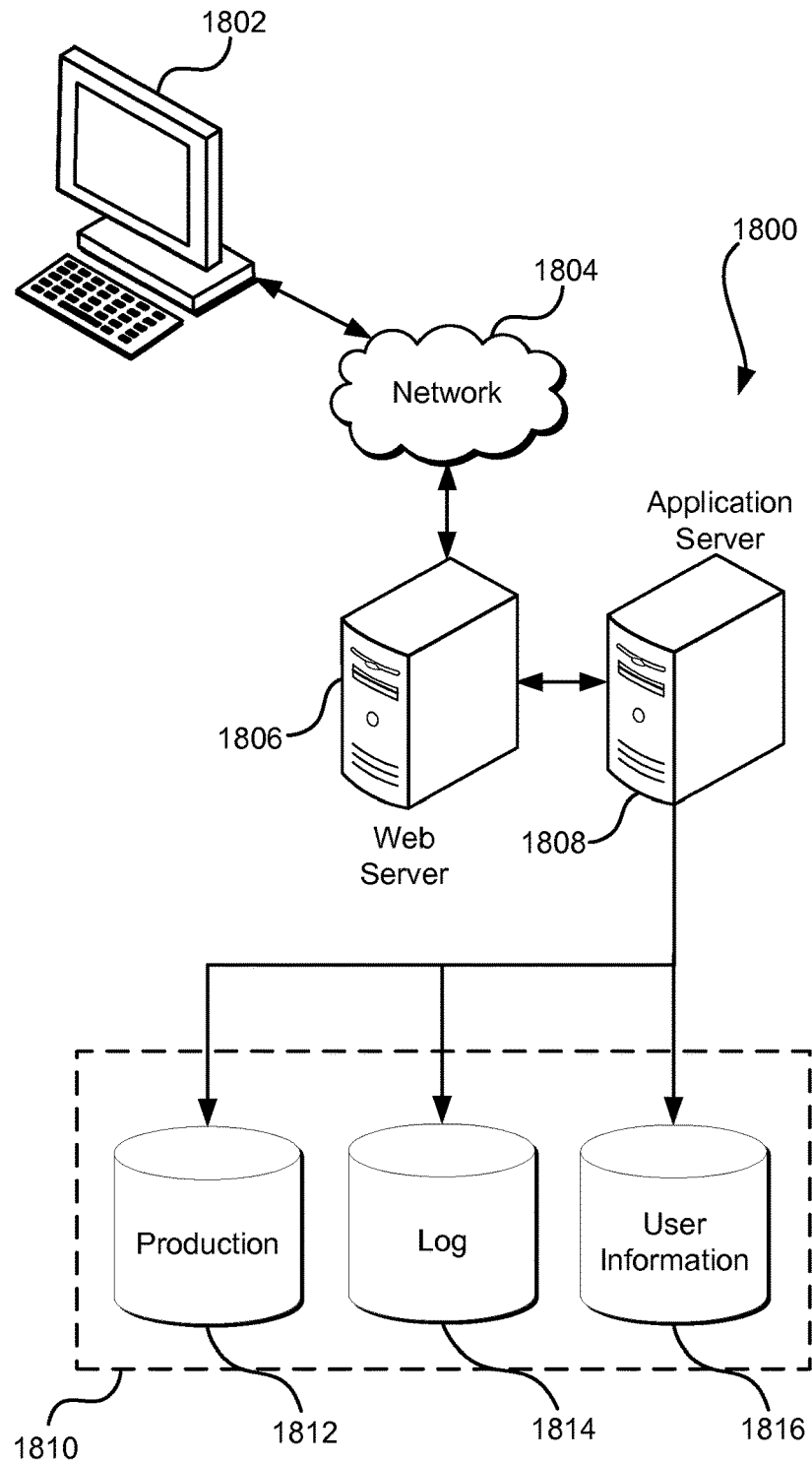
FIG. 18 illustrates an environment in which various embodiments can be implemented.

FIG. 18 illustrates aspects of an example environment 1800 for implementing aspects in accordance with various embodiments. As will be appreciated, although a web-based environment is used for purposes of explanation, different environments may be used, as appropriate, to implement various embodiments. The environment includes an electronic client device 1802, which can include any appropriate device operable to send and/or receive requests, messages or information over an appropriate network 1804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1802 and the application server 1808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1810 can include several separate data tables, databases, data documents, dynamic data storage schemes and/or other data storage mechanisms and media for storing data relating to a particular aspect of the present disclosure. For example, the data store illustrated may include mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. The application server 1808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

Embodiments of the disclosure can be described in view of the following clauses:

1. A computer-implemented method, comprising:
obtaining identification information, wherein the identification information is used to cryptographically verify a presence of a beacon device on a local area network to which the beacon device is connected and the identification information is used to authenticate to the beacon;
connecting a user device to the local area network and determining whether the local area network is associated with a secure environment by at least:
detecting an availability of the beacon device on the local area network;
authenticating to the beacon device based at least in part on the obtained identification information; and
performing an authentication process for authenticating the beacon device and the local area network to the user device based at least in part on the obtained identification information; and causing the user device to modify a security state of the user device corresponding to at least one security policy of the user device based at least in part on an outcome of the authentication process indicating whether the user device is in a secure environment.

2. The computer-implemented method of clause 1, wherein obtaining the identification information further includes transmitting data between the user device and the beacon device using a near field communications protocol.

3. The computer-implemented method of clauses 1 or 2, wherein the computer-implemented method further includes determining that the beacon device is no longer available on the local area network and causing the user device to modify the at least one security policy of the user device to require additional authentication information in order to perform at least one operation utilizing the user device.

4. The computer-implemented method of clauses 1 to 3 wherein modifying the security state of the user device further includes disabling at least one security feature of the user device based at least in part on the determination that the local area network is in the secure environment.

5. A beacon device, comprising:
one or more processors; and memory with instructions that, when executed by the one or more processors, cause the beacon device to:
detect a user device connected to a network where the beacon device is available on the network;
perform an authentication process between the user device and the beacon device such that successful completion of the authentication process verifies to the user device an identity of the network and an indication that the user device is associated with a secure environment; and cause the user device to enforce a security policy associated with the user device based at least in part on an outcome of the authentication process.

6. The beacon device of clause 5, wherein the memory further includes instructions, that when executed by the one or more processors, cause the beacon device to associate a tag with a file contained in the user device, where the association of the tag with the file causes the file to be inaccessible when the user device is on a second network where the beacon device is not detected.

7. The beacon device of clauses 5 or 6, wherein the memory further includes instructions, that when executed by the one or more processors, cause the beacon device to:
monitor the network in order to determine one or more attributes of the network; and
cause the security policy enforced by the user device to be modified such that the user device is prevented from performing one or more operations based at least in part on the one or more attributes of the network.

8. The beacon device of clauses 5 to 7, wherein the memory further includes instructions, that when executed by the one or more processors, cause the beacon device to pair with the user device, if the user device has not been previously paired with the beacon device, by at least causing the beacon device to display a code that when captured by the user device is useable in generating a key.

9. The beacon device of clauses 5 to 8, wherein the memory further includes instructions, that when executed by the one or more processors, cause the beacon device to perform a pairing operation with the user device in order to generate a cryptographic key configured to mutually authenticate the user device and the beacon device.

10. The beacon device of clauses 5 to 9, wherein the memory further includes instructions, that when executed by the one or more processors, cause the beacon device to modify the security policy based at least in part on a physical location of the user device as indicated by the outcome of the authentication process.

11. The beacon device of clauses 5 to 10, wherein the memory further includes instructions, that when executed by the one or more processors, cause the beacon device to provide the user device with access to one or more authentication tokens as a result of the user device being paired with the beacon device.

12. The beacon device of clauses 5 to 11, wherein the beacon device is physically connected to an access point device of the network the beacon device is monitoring.

13. A non-transitory computer-readable storage medium having collectively stored thereon executable instructions that, when executed by one or more processors of a computer system, cause the computer system to at least:
obtain authentication information configured to identify a network to a user device through the computer system available on the network;
provide the obtained authentication information to the user device in response to the user device connecting to the network; and
provide one or more security policies based at least in part on attributes of the network detectable by the computer system and the obtained authentication information.

14. The non-transitory computer-readable storage medium of clause 13, wherein the instructions further comprise instructions that, when executed by the one or more processors, cause the computer system to encrypt communications with the user device using the obtained authentication information.

15. The non-transitory computer-readable storage medium of clauses 13 or 14, wherein the instructions further comprise instructions that, when executed by the one or more processors, cause the computer system to perform a pairing operation, successful completion of the pairing operation causes the computer system to store a record containing information corresponding to the user device and the obtained authentication information in a database.

16. The non-transitory computer-readable storage medium of clauses 13 to 15, wherein the instructions that cause the computer system to provide the one or more security policies further include instructions that cause the user device to modify the one or more security policies based at least in part on the user device detecting an availability of the computer system on the network.

17. The non-transitory computer-readable storage medium of clauses 13 to 16, wherein the instructions that cause the computer system to apply the one or more security policies further include instructions to:
determine at least one unknown user device connected to the network; and
modify at least one of the one or more security policies in order to mitigate a security risk associated with the at least one unknown user device.

18. The non-transitory computer-readable storage medium of clauses 13 to 17, wherein the instructions that cause the computer system to modify the at least one of the one or more security policies in order to mitigate the security risk associated with the at least one unknown user device further include instructions that cause the computer system to prevent a network connection on one or more ports between the at least one unknown user device and the user device.

19. The non-transitory computer-readable storage medium of clauses 13 to 18, wherein the instructions further comprise instructions that, when executed by the one or more processors, cause the computer system to perform a mutual authentication operation between the user device and the computer system based at least in part on the obtained authentication information.

20. The non-transitory computer-readable storage medium of clauses 13 to 19,
wherein the instructions that cause the computer system to provide the one or more security policies further include instructions to:

determine a location of the user device based at least in part on information obtained by the computer system; and
modify at least one of the one or more security policies based at least in part on the location of the user device.

21. A non-transitory computer-readable storage medium having stored thereon executable instructions that, when executed by one or more processors of a computer system, cause the computer system to at least:
obtain a set of security policies configured to control the operation of one or more computer systems of which the computer system is a member of;
determine a presence of a beacon device on a network;
in response to determining the presence of the beacon device, provision the computer system by at least:
authenticating the computer system and the beacon device by at least exchanging authentication information between the computer system and the beacon device; and
enforcing a first security policy of the set of security policies; and
in response to determining a lack of presence of the beacon device on the network, provision the computer system by at least enforcing a second security policy of the set of security policies.

22. The non-transitory computer-readable storage medium of clause 21, wherein the instructions that cause the computer system to enforce the first security policy of the set of security policies further include instructions that cause the computer system to cause a locking mechanism of the computer system to be disabled such that the computer system does not require input of authentication information in order to be operated.

23. The non-transitory computer-readable storage medium of clauses 21 or 22, wherein the instructions further comprise instructions that, when executed by the one or more processors, cause the computer system to cause a prompt to be displayed on the computer system indicating that a second computer system is attempting to establish a trusted relationship with the beacon device and request user approval for establishing the trusted relationship.

24. The non-transitory computer-readable storage medium of clauses 21 to 23, wherein the instructions further comprise instructions that, when executed by the one or more processors, cause the computer system to obtain the set of security policies through an interface of the beacon device and modify one or more security settings of the computer system based at least in part on the set of security policies.

25. A system, comprising:
at least one computing device configured to:
detect an availability of a user computing device associated with a beacon device for which there is at least one security policy associated with the user computing device;
provide authentication information to the user computing device by at least performing an authentication operation between the user computing device and the beacon device; and
cause the user computing device to enforce the at least one security policy provided by the beacon device based at least in part on a result of the authentication operation.

26. The system of clause 25, wherein enforcing the at least one security policy further includes encrypting an application of the user computing device such that the application is executable only when the beacon device is available.

27. The system of clauses 25 or 26, wherein enforcing the at least one security policy further includes providing the user computing device with a decryption key configured to decrypt the application.

28. The system of clauses 25 to 27, wherein enforcing the at least one security policy further includes allowing a particular connection based at least in part on an availability of the beacon device, the user computing device configured not to allow the particular connection when the beacon device is unavailable.

29. The system of clauses 25 to 28, wherein enforcing the at least one security policy further includes allowing the user computing device to access media content based at least in part on a token provided by the beacon device.

30. The system of clauses 25 to 29, wherein the at least one computing device is configured to:
   detect an unavailability of the beacon device on a network; and
   cause the user computing device to mitigate at least one security risk based at least in part on the unavailability of the beacon device.

31. The system of clauses 25 to 30, wherein enforcing the at least one security policy further includes enabling access to the user computing device without requiring authentication information to be enter into an input peripheral of the user computing device.

32. The system of clauses 25 to 31, wherein the at least one computing device is configured to:
   receive credential information for the user computing device; and
   store the received credential information based at least in part on an availability of the beacon device.

33. A computer-implemented method, comprising:
   under the control of one or more computer systems configured with executable instructions,
      performing an authentication operation between a first user device and a second user device, the first user device and the second user device connected to a network, the network containing a beacon device;
      as a result of success of the authentication operation, associating the first user device with the beacon device, where the authentication operation includes an approval, by the second user device, for the first user device to access the network; and
      accessing, by the first user device, one or more restricted computing resources based at least in part on the first user device and the beacon device being connected to the network.

34. The computer-implemented method of clause 33, wherein the computer-implemented method further includes transmitting a notification to the second user device in response to the first user device connecting to the network.

35. The computer-implemented method of clauses 33 or 34, wherein the computer-implemented method further includes:
   determining one or more policies for the first user device and the second user device, where the one or more policies define access to the one or more restricted computing resources; and
   enforcing the one or more policies based at least in part on the first user device, the second user device and the beacon device being connected to the network.

36. The computer-implemented method of clauses 33 to 35, wherein determining the one or more policies further includes receiving the one or more policies through an interface exposed to the second user device.

37. The computer-implemented method of clauses 33 to 36, wherein the computer-implemented method further includes:
   detecting an unknown device connected to the network; and
   causing the second user device to enforce additional policies as a result of detecting the unknown device.

38. The computer-implemented method of clauses 33 to 37, wherein enforcing the one or more policies further includes allowing access to the one or more restricted computing resource without requiring the first user device to provide authentication information.

39. The computer-implemented method of clauses 33 to 38, wherein enforcing the one or more policies further includes encrypting at least a portion of memory of the second user device or the first user device.

40. The computer-implemented method of clauses 33 to 39, wherein enforcing the one or more policies further includes providing the second user device with a key configured to decrypt the portion of memory of the second user device or the first user device based at least in part on one or more attributes detectable by the beacon device.

41. A computer-implemented method, comprising:
   under the control of one or more computer systems configured with executable instructions,
      detecting a first computing device connected to a network, where the first computing device has not previously been associated with a beacon device connected to the network;
      determine a second computing device previously paired with the beacon device and configured to provide approval for provisioning devices;
      performing mutual authentication between the second computing device and the beacon device such that successful mutual authentication indicates to the second computing device that the network is in a secure environment;
      prompting the second computing device for approval requiring user input indicative of approval in order to provision the first computing device and indicative of information corresponding to one or more credentials to provision the first computing device to include;
      as a result of receiving an indication of approval from the second computing device, generating an access token based at least in part on the one or more credentials indicated by the user; and
      enabling the first computing device to access the token such that the first computing device can access one or more restricted computing resources based at least in part on a request to access the one or more restricted computing resources including the token.

42. The computer-implemented method of clause 41, wherein prompting the second computing device further includes prompting the second computing device for input of the one or more credentials, the one or more credentials to be stored by the beacon device.

43. The computer-implemented method of clauses 41 or 42, wherein the computer-implemented method further includes causing the first computing device to connect to a default network implemented by the beacon device, the default network configured to transmit information to the first computing device for provisioning.

44. The computer-implemented method of clauses 41 to 43, wherein the beacon device is responsible for including the token in the request to access the one or more restricted computing resources.

45. A beacon device, comprising:
   one or more processors; and
   memory with instructions that, when executed by the one or more processors, cause the beacon device to:

store, in the memory, authentication information useable for generating one or more tokens configured to enable access to restricted computing resources;

receive a request from a user device for a token of the one or more tokens;

determine the user device has previously been provisioned by the beacon device by at least performing a mutual authentication operation between the beacon device and the user device; and providing the user device with the token of the one or more tokens based at least in part on the determination.

46. The beacon device of clause 45, wherein performing the mutual authentication operation further includes receiving an indication of a shared secret from the user device, the indication of the shared secret matching a record included in a database of paired devices.

47. The beacon device of clauses 45 or 46, wherein receiving the indication of the shared secret further includes determining the indication of the shared secret indicate the shared secret being previously generated during a pairing operation with the beacon device.

48. The beacon device of clauses 45 to 47, wherein the one or more tokens include password information useable to enable access to restricted computing resources 49. The beacon device of clauses 45 to 48, wherein the memory further includes instructions, that when executed by the one or more processors, cause the beacon device to provide access to restricted computing resources on behalf of a resource owner, where the resource owner has authorized the beacon device to delegate access.

50. The beacon device of clauses 45 to 49, wherein the memory further includes instructions, that when executed by the one or more processors, cause the beacon device to provide an interface to enable the resource owner to specify restricted computing resources that the beacon device can delegate access to.

51. The beacon device of clauses 45 to 50, wherein the one or more tokens configured to enable access to restricted computing resources include credentials for accessing one or more services of a service provider.

52. The beacon device of clauses 45 to 51, wherein the one or more tokens configured to enable access to restricted computing resources include credentials for accessing an application of the user device.

53. A non-transitory computer-readable storage medium having stored thereon executable instructions that, when executed by one or more processors of a computer system, cause the computer system to at least:

perform an authentication operation with a user device connected to a network, the authentication operation configured to mutually authenticate the user device and the computer system such that successful authentication indicates to the user device that the network is in a secure environment;

store at least some authentication information obtained from the user device, the authentication information enabling access to a restricted computing resource or enabling delegation of access to the restricted computing resource;

generate a token based at least in part on the authentication information; and provide the token to at least one other user device based at least in part on the computer system receiving an indication of approval from the user device.

54. The non-transitory computer-readable storage medium of clause 53, wherein the instructions that cause the computer system to generate the token further include instructions that cause the computer system to generate the token such that the token is configured to enable access to a network device, the network device being an end point of a local area network.

55. The non-transitory computer-readable storage medium of clauses 53 or 54, wherein the instructions further comprise instructions that, when executed by the one or more processors, cause the computer system to transmit a notification to the user device in response to the computer system detecting an availability of another user device.

56. The non-transitory computer-readable storage medium of any of clauses 53 to 55, wherein the instructions further comprise instructions that, when executed by the one or more processors, cause the computer system to provide the other user device with the token based at least in part on a response to the notification.

57. The non-transitory computer-readable storage medium of clauses 53 to 56, wherein the instructions further comprise instructions that, when executed by the one or more processors, cause the computer system to perform a pairing operation between the computer system and the other user device based at least in part on a response to the notification.

58. The non-transitory computer-readable storage medium of clauses 53 to 57, wherein the instructions that cause the computer system to generate the token further include instructions that cause the computer system to generate the token such that the token is configured to enable access to a service of a service provider.

59. The non-transitory computer-readable storage medium of clauses 53 to 58, wherein the instructions that cause the computer system to provide the token to the at least one other user device further include instructions that cause the computer system to provision the at least one other device such that the at least one other user device includes an authentication key enabling the at least one other user device to access a network.

60. The non-transitory computer-readable storage medium of clauses 53 to 59, wherein the instructions further comprise instructions that, when executed by the one or more processors, cause the computer system to provide an interface configured to receive a selection of tokens corresponding to authentication information to provide to the at least one other computing device.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of being executed by one or more processors of a computer system, cause the computer system to at least:
   connect the computer system to a network, wherein the network includes one or more computer systems of which the computer system is a member of;
   obtain a set of security policies to control the operation of one or more computer systems;
   determine, on the network, a presence of a beacon device from the one or more computer systems;
   provision the computer system in response to determining the presence of the beacon device on the network by at least:
      performing mutual authentication, through communication over the network, of the computer system and the beacon device based at least in part on exchanging authentication information between the computer system and the beacon device over the network, the authentication information generated by the computer system and the beacon device with respective cryptographic keys;
      using the beacon device to authenticate over the network, as a result of the mutual authentication, the network to the computer system; and
      enforcing, by the beacon device, based on authenticating the network to the computer system, a first security policy of the set of security policies; and
   provision the computer system by at least enforcing, by the beacon device, a second security policy of the set of security policies in response to determining a lack of presence of the beacon device on the network.

2. The non-transitory computer-readable storage medium of claim 1, wherein the instructions that cause the computer system to enforce the first security policy of the set of security policies further include instructions that cause the computer system to cause a locking mechanism of the computer system to be disabled such that the computer system does not require input of authentication information in order to be operated.

3. The non-transitory computer-readable storage medium of claim 1, wherein the instructions further comprise instructions that, as a result of being executed by the one or more processors, cause the computer system to cause a prompt to be displayed on the computer system indicating that a second computer system is attempting to establish a trusted relationship with the beacon device and request user approval for establishing the trusted relationship.

4. The non-transitory computer-readable storage medium of claim 1, wherein the instructions further comprise instructions that, as a result of being executed by the one or more processors, cause the computer system to obtain the set of security policies through an interface of the beacon device and modify one or more security settings of the computer system based at least in part on the set of security policies.

5. A system, comprising:
   one or more processors; and
   memory with instructions that, as a result of being executed by the one or more processors, cause the system to:
      detect a user computing device is connected to a network for which there is at least one security policy associated with the user computing device;
      detect, while the user computing device is connected to the network, a beacon device;
      provide authentication information to the user computing device by at least performing a mutual authentication operation between the user computing device and the beacon device through communication over the network, the mutual authentication operation including at least exchanging authentication information generated based at least in part on cryptographic keys shared by the user computing device and the beacon device, the authentication information including information authenticating at least one other device accessible to the user computing device; and enforce, by the beacon device, at least one security policy on the user computing device based at least in part on a result of the mutual authentication operation, the result of the mutual authentication operation authenticates, over the network, the network to the user computing device.

6. The system of claim 5, wherein enforcing the at least one security policy includes encrypting an application of the user computing device such that the application is executable only when the beacon device is available.

7. The system of claim 6, wherein enforcing the at least one security policy includes providing the user computing device with a decryption key to decrypt the application.

8. The system of claim 5, wherein enforcing the at least one security policy includes allowing a particular connection based at least in part on an availability of the beacon device, the user computing device disallows the particular connection when the beacon device is unavailable.

9. The system of claim 5, wherein enforcing the at least one security policy includes allowing the user computing device to access media content based at least in part on a token provided by the beacon device.

10. The system of claim 5, wherein the system further includes instructions that, if executed by the one or more processors, cause the system to:

detect an unavailability of the beacon device on the network; and cause the user computing device to mitigate at least one security risk based at least in part on the unavailability of the beacon device.

11. The system of claim 5, wherein enforcing the at least one security policy includes enabling access to the user computing device without requiring authentication information to be entered into an input peripheral of the user computing device.

12. The system of claim 5, wherein the system further includes instructions that, if executed by the one or more processors, cause the system to:

receive credential information for the user computing device; and store the received credential information based at least in part on an availability of the beacon device.

13. A computer-implemented method, comprising:

establishing a connection on a network between a first user device and a second user device;

detecting, while the first user device and the second user device is connected to the network, a beacon device on the network;

performing a mutual authentication operation, over the network, between the first user device and the second user device by at least exchanging authentication information, the authentication information further includes information authenticating the network;

associating the first user device with the beacon device as a result of success of the mutual authentication operation, where the mutual authentication operation includes an approval, by the second user device, for the first user device to access the network while being connected to beacon device over the network; and causing, by the beacon device, the first user device to access one or more restricted computing resources based on at least one security policy enforced by the beacon device.

14. The computer-implemented method of claim 13, wherein the computer-implemented method further includes transmitting a notification to the second user device in response to the first user device connecting to the network.

15. The computer-implemented method of claim 13, wherein the computer-implemented method further includes:

determining one or more policies for the first user device and the second user device, where the one or more policies define access to the one or more restricted computing resources; and enforcing the one or more policies based at least in part on the first user device, the second user device and the beacon device being connected to the network.

16. The computer-implemented method of claim 15, wherein determining the one or more policies further includes receiving the one or more policies through an interface exposed to the second user device.

17. The computer-implemented method of claim 15, wherein the computer-implemented method further includes:

detecting an unknown device connected to the network; and causing the second user device to enforce additional policies as a result of detecting the unknown device.

18. The computer-implemented method of claim 15, wherein enforcing the one or more policies further includes allowing access to the one or more restricted computing resource without requiring the first user device to provide authentication information.

19. The computer-implemented method of claim 15, wherein enforcing the one or more policies further includes encrypting at least a portion of memory of the second user device or the first user device.

20. The computer-implemented method of claim 15, wherein enforcing the one or more policies further includes providing the second user device with a key to decrypt the portion of memory of the second user device or the first user device based at least in part on one or more attributes detectable by the beacon device.

* * * * *